United States Patent Office 3,359,224
Patented Dec. 19, 1967

3,359,224
THIOATED CELLULOSIC/AMYLACEOUS SUBSTRATE - ETHYLENICALLY UNSATURATED MONOMER GRAFT COPOLYMER
Robert W. Faessinger, Media, and John S. Conte, Ridley Park, Pa., assignors to Scott Paper Company, Philadelphia, Pa., a corporation of Pennsylvania
No Drawing. Original application July 6, 1966, Ser. No. 563,055. Divided and this application Dec. 7, 1966, Ser. No. 599,715
44 Claims. (Cl. 260—17.4)

ABSTRACT OF THE DISCLOSURE

Peroxidic initiated graft polymerization of ethylenically unsaturated monomer using as substrates cellulosic and amylaceous materials, e.g., unpasted starch, which contain monothiocarbonate or dithiocarbonate groups, and copolymers produced by the process.

---

This invention relates to processes for producing a copolymer of an ethylenically unsaturated monomer with substantially water insoluble substrates as defined herein by peroxidic free radical initiated graft polymerization and to the novel copolymers produced thereby. This application is a division of application S.N. 563,055, filed July 6, 1966, as a continuation-in-part of now abandoned applications S.N. 271,491 and 271,492, filed April 8, 1963, 339,324, filed January 22, 1964; 345,577, filed February 18, 1964; 432,816, 432,825, 432,834, 432,853, 432,855, 432,902 and 432,904, filed February 15, 1965; and 491,395, filed September 29, 1965.

It is an object to provide novel graft polymerization processes. Another object is to provide graft polymerization processes free from one or more of the limitations or disadvantages of prior art graft polymerization processes. It is another object to provide novel graft polymers. Other objects will be apparent to those skilled in the art to which this invention pertains.

According to the processes described herein a substantially water-insoluble, cellulosic or amylaceous monothiocarbonate or dithiocarbonate polymeric substrate as defined herein is reacted, via peroxidic free radical initiated graft polymerization, with an ethylenic unsaturated monomer to produce a graft polymer.

Mino et al. U.S. Patent 2,922,768 discloses a process for graft polymerizing various polymeric materials using a ceric ion initiated system in which a reducing agent is present. The present graft polymerizations are peroxidic initiated and utilize polymeric substrates bearing substituents as defined herein which provide the other half of the redox system.

British Patent 818,412 discloses a redox graft polymerization system in which a ferrous, chromous, manganous, etc. ion is bound to the substrate by the ion exchange capacity of the substrate. The present graft polymerizations utilize sulfur containing substrates as defined herein to provide, with the peroxidic initiator, the redox system used to effect the graft polymerization.

There are problems associated with prior art graft polymerization processes, such as the need for an inert atmosphere, need to operate at either low, high or specific temperatures, use of expensive metal catalysts, use of dangerous radioactive materials (often leading to substrate degradation), need for non-aqueous system, need for concentrated reaction systems, etc. Oxidative processes using ozone or oxygen, like high-energy radiation, lead to serious strength losses of the substrate. Ceric ion-initiated chemical reactions produce excessive amounts of vinyl homopolymer. The present graft polymerizations are free from one or more of the aforesaid limitations and disadvantages. Moreover, the graft polymerizations have many advantages not possessed by other types of graft polymerizations.

The graft polymerizations described herein are novel in that both the substrate and monomer participating in the copolymerization may be of diverse nature. The substrate may be used in any of its conventional forms. The copolymerization may be accomplished as a batch process or as a continuous treatment process. Through the proper practice of each invention, strength losses can be avoided and a highly efficient addition of the monomer or monomers to the substrate is accomplished. The properties of the substrate can be modified in virtually any manner desired by the choice of monomer or combination of monomers and the amount thereof grafted to the substrate.

The present graft polymerizations can be carried out in dilute aqueous solutions of monomer or monomers, as well as in concentrated solutions of monomer or monomers. Also, each may be conducted in either dilute or concentrated suspensions of the substrate.

An inert atmosphere is not essential, but may be used if desired. A very surprising aspect of the polymerizations is monomer solution need not be entirely free from polymerization inhibitors.

Extremes of temperature are not ordinarily necessary as the co-polymerization will proceed at ambient temperatures.

PEROXIDIC INITIATOR

The graft polymerizations described herein utilize a peroxidic initiator as part of the redox system. By redox system is meant the well known systems of the type described in D'Alelio, Gaetano F., Fundamental Principles of Polymerization, John Wiley and Sons, New York, 1952. Such peroxidic initiators include hydrogen peroxide, persulfates such as ammonium, sodium or potassium persulfate, hydroperoxides such as t-butyl hydroperoxide, diisopropylbenzene hydroperoxide, cumene hydroperoxide, 1-phenylethylhydroperoxide, etc., diacylperoxides such as benzoyl peroxide, acetyl peroxide and the like, di-alkyl peroxides such as di-t-butyl peroxide, dicumyl peroxide, etc.; peresters such as t-butyl peroxyacetate, t-butyl peroxybenzoate and the like; peracids such as performic acid, peracetic acid, perbenzoic acid, peroxylactic acid and the like; and others such as dialkyl peroxydicarbonates. These peroxy compounds must be capable of initiating a free-radical polymerization by themselves or in the presence of an activator, such as a reducing agent. The preferred group of peroxidic free-radical initiators are those that are water-soluble when the copolymerization is conducted in an aqueous medium.

As would be expected, the peroxidic initiator should be uniformly distributed throughout the monomer solution.

MONOMERS

The monomers which can be co-reacted with the substrate in the manner described herein to yield new graft polymers are those ethylenically unsaturated compounds which readily homopolymerize or readily copolymerize with other ethylenically unsaturated compounds either in bulk, or in an aqueous solution, or as an emulsion, when exposed to a redox system capable of initiating a polymerization or copolymerization. By the term monomer is mean an ethylenically unsaturated compound having the structure $>C=C<$ which encompasses vinylene monomers of the general form $CHR=CHR$ and vinylidene monomers of the general form $H_2C=CR_2$ and including the monomers on which all four of the open valence bonds are occupied by R substituents as well as those in which at least two R substituents, one on each carbon atom, form a ring derivative.

The radical R is selected from at least one member of the electron-accepting groups and electron-detonating groups consisting of:

(1) Hydrogen.

(2) Alkyl, alkene and alkyne, the substituted as well as the unsubstituted in which the hydrocarbon moiety contains less than six carbon atoms such as methyl, ethyl, butyl, amyl, hexyl, ethenyl, hydroxymethyl, chloromethyl, etc.

(3) Aryl and substituted aryl such as phenyl, alpha-chlorotolyl, tolyl, 4-chlorophenyl, alpha-tolyl, xylyl, 2-bromo-4-ethylphenyl, etc.

(4) The electronegative groups, e.g., chloro, bromo, cyano, carboxy, carbalkoxy, acyloxyl, alkenyl, and the like.

(5) Alicyclic and heterocyclic, substituted and unsubstituted, such as pyridyl, thienyl, furyl, pyrrolidyl, etc.

(6) Groups of the general formula

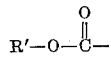

wherein R' is selected from the group consisting of hydrogen, R, and substituted as well as the unsubstituted hydrocarbons containing from 1 to 18 carbon atoms, such as methyl, ethyl, butyl, amyl, hexyl, heptyl, octadecyl, nitroethyl, nitrobutyl, N,N-dimethylaminoethyl, t-butylaminoethyl, 2-cyanoethyl, cyclohexyl, N,N-diethylaminoethyl, hydroxyethyl, hydroxypropyl and the like.

(7) Groups of the general formula

(8) Groups of the general formula

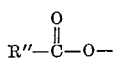

(9) Groups of the general formula

(10) Groups of the general formula

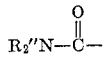

wherein R'' is selected from at least one member of the group consisting of hydrogen, R or R', aliphatic groups of from 1 to 18 carbon atoms and in addition the substituted as well as the unsubstituted hydrocarbons containing from 1 to 18 carbon atoms such as the methyl, ethyl, propyl, butyl, amyl, hexyl, heptyl, octadecyl, chloroethyl, chloromethyl, hydroxyethyl, hydroxypropyl, epoxyethyl, phenyl, p-chlorophenyl, and the like.

At least one of the members of the following group of ethylenically unsaturated monomers which readily homopolymerize or readily copolymerize with other ethylenically unsaturated compounds either in bulk, or in an aqueous solution, or as an emulsion may be used: ethylenically unsaturated aromatic compounds and mono, di, tri, tetra and penta substituted aromatic compounds, wherein the ring is substituted with at least one member selected from the class consisting of alkyl (substituted and unsubstituted) having from 1 to 7 carbon atoms and/or with inorganic electron-accepting and/or inorganic electron-donating groups such as halogen, nitro, sulfono, etc., and wherein the ethylenically unsaturated moiety has from 2 to 5 carbon atoms, either substituted or unsubstituted such as alpha-methylstyrene, p-chloromethylstyrene, o-methylstyrene, m-methylstyrene, 2,4-dimethylstyrene, 2,5-dimethylstyrene, 2,4,5-trimethylstyrene, p-ethylstyrene, o-bromostyrene, 2-bromo-4-ethylstyrene, p-isopropylstyrene, p-chlorostyrene, 2,4-dichlorostyrene, p-bromostyrene, o-chlorostyrene, m-chlorostyrene, beta-chlorostyrene, 2,5-dichlorostyrene, 4-ethoxystyrene, p-isopropyl-alpha-methylstyrene, beta-nitrostyrene, p-nitrostyrene and the like; also polymerizable alkylacrylic acids having from 1 to 5 carbon atoms in the alkyl chain provided, in all instances, when there is no alkyl chain, the substituent is hydrogen or some other specified moiety, such as halogens, cyano etc., e.g., acrylic acid, methacrylic acid, alpha-chloroacrylic acid, 2-furfurylacrylic acid and the like; alkylacrylic acid esters having from 1 to 5 carbon atoms in the alkyl chain provided, in all instances, when there is no alkyl chain, the substituent is hydrogen or some other specified moiety, such as halogen, cyano, etc., and wherein the esters are formed from monohydric alcohols (substituted and unsubstituted) selected from the group consisting of alkyl alcohols having from 1 to 20 carbon atoms such as amyl acrylate, amyl methacrylate, benzyl methacrylate, benzyl acrylate, glycidyl methacrylate, butyl acrylate, butyl methacrylate, dodecyl acrylate, cyclohexyl acrylate, cyclopentyl methacrylate, ethyl acrylate, methyl-alpha-bromoacrylate, methyl-alpha-chloroacrylate, ethyl methacrylate, 2-ethylhexyl acrylate, heptyl acrylate, ethyl-alpha-bromoacrylate, hexyl methacrylate, lauryl methylacrylate, methyl acrylate, methyl methacrylate, stearyl acrylate, stearyl methacrylate, propyl acrylate, 2-bromoethyl acrylate, 2-chloroethoxyethyl methacrylate, etc.; the substituted amino alcohols having from 2 to 7 carbon atoms in the alkyl chain and from 1 to 7 carbon atoms in the alkyl chains on the amino moiety such as N,N-dimethylaminoethyl acrylate, N-t-butylaminoethyl methacrylate, N,N-diethylaminoethyl acrylate, 2-N-morpholinethyl methacrylate and the like; nitro alcohols wherein the alkyl chain has from 2 to 7 carbon atoms such as 3-nitro-2-butanol, 2-nitro-3-hexanol, 2-methyl-2-nitro-1-butanol, 2-nitro-2-methyl propanol, etc.; cyanoalkyl alcohols wherein the alkyl chain has from 2 to 7 carbon atoms such as 2-cyanoethyl acrylate and the like; unsaturated polymerizable alkylacrylic acid amides having from 1 to 5 carbon atoms in the alkyl chain provided, in all instances, when there is no alkyl chain, the substituent is hydrogen or some other specified moiety described above, and also wherein the amide is formed from ammonia, primary and secondary amine or a diamine having from 1 to 16 carbon atoms (substituted and unsubstituted) such as acrylamide, methacrylamide, ethacrylamide, methylene-bis-acrylamide, t-butylacrylamide, 2-cyanoacrylamide, N-(p-chlorophenyl) methacrylamide, N,N-diallylacrylamide, N,N-dimethylacrylamide, hexamethylene-bis-acrylamide, N-alphanaphthylacrylamide, etc.; or the ethylenically unsaturated nitriles such as acrylonitrile, methacrylonitrile, ethacrylonitrile, alpha-chloroacrylonitrile and the like; polymerizable alkylene glycol and polyhydric glycol alkylacrylates and dialkylacrylates having 1 to 5 carbon atoms in the alkyl chain provided, in all instances, when there is no alkyl chain, the substituent is hydrogen or some other specified moiety described above, such as ethylene glycol dimethacrylate, triethylene glycol dimethacrylate, polyethylene glycol dimethacrylate, tetramethylene dimethacrylate, glyceryl triacrylate, hydroxyethyl methacrylate, hydroxypropyl methacrylate and the like; fatty acid esters of 1-olefins (substituted and unsubstituted), containing from 2 to 24 carbon atoms but preferably from 2 to 18 atoms wherein the 1-olefin alcohol precursor of the fatty acid esters has from 2 to 8 carbon atoms but preferably 2 to 3 carbon atoms, such as, vinyl acetate, vinyl propionate, vinyl butyrate, isopropenylacetate, vinyl-n-hexanoate, vinylchloroacetate, vinylcrotonate, vinyl-n-decanoate, vinylformate, vinyl-2-ethyl hexoate, vinyl laurate, vinyl oleate, vinyl stearate, vinyl trifluoroacetate, allyl linolate, allyl oleate, allyl acetate, allyl propionate, allyl chloroacetate, allyl caproate, allyl butyrate, etc.; aromatic acid esters (substituted and unsubstituted) of unsaturated alcohols wherein the alcohol precursor has from 2 to 8 carbon atoms but preferably from 2 to 3 carbon atoms such as allyl benzoate, diallyl phthalate, vinyl phthalate, vinyl benzoate, etc.; ethylenically unsaturated aliphatic diacids containing from 4 to 10 carbon atoms but preferably from 4 to 6 carbon atoms, and their esters, nitriles and amides such as, itaconic acid, maleic acid, fumaric acid, dimethyl maleate, dibutyl maleate, dimethyl fumarate, dibutyl fumarate, maleic anhydride, diethyl fumarate, etc.; polymerizable aliphatic dienes such as butadiene, 2,3-dimethyl butadiene, isoproprene, pentadiene, etc. and the haloprenes such as cholorprene and the like; 1-olefins (substituted and unsubstituted) containing from 2 to 18 carbon atoms but preferably from 2 to 8 carbon atoms such as vinyl chloride, vinylidene chloride, allylamine, diallylamine, diallylphosphate, allyl chloride, nitroethylene, butadiene monoxide, vinyl acrylate and the like; the vinyl ethers (substituted and unsubstituted), such as vinylethyl ether, vinylpropyl ether, vinylisobutyl ether, vinyl-2-methoxyethyl ether, vinyl-n-butyl ether, vinyl-2-chloroethyl ether, vinyl-2-ethylhexyl ether and the like or other vinyl compounds such as divinylsulfone, divinylsulfide, divinylbenzene, etc.; ethylenically unsaturated heterocyclic compounds wherein the heterocycle contains from 3 to 5 carbon atoms and the hetero atoms are selected from the group consisting of N, O and S such as the vinyl pyridines, N-vinyl pyrrolidone, vinyl furan, alpha vinyl thiophene and the like. In general, the only requirement necessary in order for a monomer to be useful in this invention is that it has at least one olefinic double bond which readily homopolymerizes or readily copolymerizes with other ethylenically unsaturated compounds either in bulk, or in an aqueous solution, or as an emulsion.

More specifically, at least one member of the following group of polymerizable or copolymerizable monomers is useful: styrene, p-chloromethyl styrene, sodium p-styrene-sulfonate, vinyl toluene, 2,5-dichlorostyrene, alpha-methyl styrene, acrylamide, acrylic acid, acrylonitrile, N-t-butyl acrylamide, methacrylamide, N,N-methylene-bis-acrylamide, N,N-diethylacrylamide, methacrylic acid, t-butylaminoethyl methacrylate, N,N-diethylaminoethyl acrylate, N,N-diethylaminoethyl methacrylate, N,N-dimethylaminoethyl acrylate, 2-cyanoethyl acrylate, n-butyl acrylate, n-butyl methacrylate, decyl acrylate, decyl methacrylate, ethyl acrylate, 2-ethylhexyl acrylate, ethyl methacrylate, glycidyl acrylate, glycidyl methacrylate, n-hexyl methacrylate, n-lauryl methacrylate, methyl acrylate, methyl methacrylate, decyl-octyl methacrylate, stearyl methacrylate, ethylene glycol dimethacrylate triethylene glycol dimethacrylate, tetraethylene glycol dimethacrylate, polyethylene glycol dimethacrylate, hydroxypropyl methacrylate, hydroxyethyl methacrylate, diallyl adipate, diallyl maleate, N,N-diallyl melamine, diallyl phthalate, diallyl phosphite, diallyl phosphate, diallyl fumarate, vinyl chloride, vinylidene chloride, maleic acid, itaconic acid, fumaric acid, di-n-butyl fumarate, di-n-butyl maleate, di-n-butyl itaconate, diethyl maleate, methyl vinyl ketone, 2-methyl-5-vinylpyridine, N-vinyl carbazole, 2-vinyl pyridine, 1-vinyl-2-pyrrolidone, N-vinyl pyrrolidone, vinyl-n-butyl ether, vinyl-isobutyl ether, vinyl-2-chloroethyl ether, vinyl ethyl ether, vinyl-2-ethylhexyl ether, vinyl triethoxysilane, vinyl stearate, vinyl butyrate, vinyl acetate, vinyl-2-ethyl-hexoate, vinyl propionate, divinyl benzene and divinyl sulfone.

SUBSTRATES

The water-insoluble substrates utilized in the graft polymerization processes described herein are thioated cellulose and non-cellulosic thioated amylaceous polysaccharide.

The term "substantially water-insoluble" means a substate whose solubility, in the form in which it is employed, in water at 30° C. or less does not exceed about 10 percent of its weight. Because the substrate used in the graft polymerizations described herein is usually formed under alkaline conditions, both it and the polymeric substance from which it is formed must also be substantially alkaline insoluble, at least at the alkaline pH used to form the substrate and to graft polymerize, if alkaline conditions are employed.

The cellulose substrate can be used in any of its conventional forms, e.g., as a powder, films, filaments, fibers and shaped objects. When in fiber or filament form, the substrate can be used as such or in the form of carding, roving, non-woven sheets, threads, yarns, knitted fabric, woven cloth, or garments.

The thioated substrates are, except as otherwise stated herein, dithiocarbonate derivatives and monothiocarbonate derivatives of the parent polymer. These thioated substrates can be produced by the reaction of the alkaline wet parent polymer with carbon disulfide and carbonylsulfide, respectively.

The term "cellulose" means those forms of cellulose in which the cellulose molecule is chemically essentially unmodified, i.e., non-etherified, non-esterified, etc., and includes cotton, linen, rayon, hemp and sisal, in their various conventional forms, such as films, fibers or filaments as such or in the form of carding, roving, thread, yarn, cord, knitted fabrics, woven cloth, non-woven fabric, garments, etc., wood in its various forms, such as pulp, bleached and unbleached alpha-cellulose, ground wood, sawdust, wood shavings, chips, and excelsior, etc.

The term "amylaceous" covers both the amylose and amylopectin entities and the various starches, e.g., potato, wheat, corn, rice and tapioca starches, in their non-solubilized, i.e., unpasted, forms.

DESCRIPTION OF PROCESS

A. *Thioated substrate formation*

The term "thioated substrate" embraces dithiocarbonated and monothiocarbonated substrates and the corresponding substrates produced by disproportionation or rearrangement during mono- or di-thiocarbonation.

The thioated substrate which is graft polymerized can be prepared by wetting the corresponding non-thioated substrate with an alkaline solution. This is done, generally, with a sodium hydroxide solution, or a solution of some other alkali metal hydroxide. The strength of the alkaline solution used in each particular case will be dependent, of course, upon the nature of the substrate and the type of end-product desired; but generally, concentrations in the range of about .05 molar to about 1 molar are preferred. The amout of alkali or alkaline salt or mixtures of alkalies and alkaline salts used is that amount necessary to achieve the desired degree of thiocarbonation of the substrate. Unless a very high or very low degree of thioation is desired, the amount of alkali employed is not particularly critical so long as it does not result in the production of a water soluble thioate. Such alkalies as lithium, sodium, potassium, rubidium, and cesium hydroxides, ammonium hydroxide, quaternary ammonium hydroxides such as tetramethylammonium hydroxide, methyltriethylammonium hydroxide, trimethylbenzylammonium hydroxide and the like, quaternary phosphonium hydroxides such as tetraethylphosphonium hydroxide, trimethylphenylphosphonium hydroxide, methyltriethylphosphonium hydroxide, trimethylisoamylphosphonium hydroxide, and the like, solfonium hydroxides such as triethylsulfonium hydroxide, methyldiethylsulfonium hydroxide, dimethylbenzylsulfonium hydroxide, methyldiethylsulfonium hydroxide and the like, quaternary arsonium hydroxides such as trimethylphenylarsonium hydroxide, tetraethylarsonium hydroxide, methyltriphenylarsonium hydroxide and the like, and quaternary stibonium hydroxides such as tetramethylstibonium hydroxide, tetraethylstibonium hydroxide, methyltriethylstibonium hydroxide and the like, as well as the slightly soluble alkaline earth metal hydroxides such as calcium, strontium, barium, etc. may be used, although the preferred method of preparation of the alkaline earth metal substrate thiocarbonate salts is from the alkali metal substrate thiocarbonate salts by metathesis. An alkali metal substrate thiocarbonate salt may also be converted to a quaternary ammonium, sulfonium, quaternary phosphonium, quaternary arsonium or quaternary stilbonium substrate thiocarbonate through metathesis.

In addition to the strong and relatively strong bases mentioned above, basic salts, and water soluble organic amines serve equally well. Such basic salts, or mixtures of these salts as sodium carbonate, trisodium phosphate, disodium hydrogen phosphate, disodium ammonium phosphate, sodium silicate, sodium aluminate, sodium antimoniate, sodium stannate, sodium cyanide, sodium cyanate, sodium sulfide, potassium carbonate, tripotassium phosphate, dipotassium phosphate, potassium silicate, potassium aluminate, potassium antimoniate, potassium stannate, potassium cyanide, potassium cyanate, potassium sulfide, lithium carbonate, trilithium phosphate, dilithium hydrogen phosphate, lithium silicate, and the like, as well as such water-soluble amines as methylamine, ethylamine, dimethylamine, pyridine, and such quaternary ammonium hydroxides as tetramethylammonium hydroxide and benzyltrimethylammonium hydroxide are just a few examples of basic materials which have served equally well in the preparation of the various water-insoluble thiocarbonates. In fact, a basic salt whose aqueous solution has a pH of about 8 or 9 or greater may be suitable. It should be recognized, also, that a mixture consisting of a basic salt and an inorganic or organic hydroxide is included in this group. However, those basic salts which are known to chemically modify the substrate and which would thereby interfere with the thiocarbonation process are to be avoided when practicing this invention.

Thiocarbonation can be accomplished by bringing the alkaline-wet substrate into intimate contact with carbon disulfide or carbonyl sulfide. Either vaporous carbon disulfide or carbonyl sulfide or a solution of the sulfide in any inert solvent or an aqueous emulsion of the sulfide in an inert water immiscible organic solvent may be used. The thiocarbonation reaction is conducted as long as is necessary to acquire the desired degree of thiocarbonation. Usually merely exposing the alkaline substrate to the carbonyl sulfide or carbon disulfide suffices.

Thiocarbonation is of a relatively low order, i.e., substrates are produced having thioate sulfur contents of the order of 0.5 percent and usually 0.3 percent or less. This low thiocarbonation is, of course, vital when it is possible to produce a water-soluble thioated substrate, e.g., from cellulose. The techniques known in the art can be used to produce water insoluble thioated substrates, e.g., using carbon disulfide in the presence of alkali to produce a dithiocarbonated substrate and carbonyl sulfide in the presence of alkali to produce a monothiocarbonated substrate.

A wide variety of thiocarbonate salts can be produced by reacting, by metathesis, an ammonium, organic ammonium, phosphonium, sulfonium, arsonium, stibonium salt or an alkali metal salt such as lithium, sodium, potassium, etc. of the thiocarbonate of the substrate with a water-soluble salt of a metal or mixture of metals from Group Ib of the Periodic Table such as Cu, Ag, and Au; Groups IIa and IIb such as Mg, Ca, Sr, Zn, Cd, etc.; Groups IIIa and IIIb such as Sc, Y, La, Al, Ga, etc. Group IVb such as Ti, Zr, etc., as well as Ge, Sn and Pb; Group Vb such as V, Nb, etc.; as well as Bi; Group VIb such as Cr, W, etc.; Group VIIb such as Mn, etc.; and Group VIII such as Fe, Co, Ni, Os, etc., to yield a new thiocarbonate derivative of the metal.

In general, the previously described alkali metal salts of the thiocarbonate are used if copolymerization is to be carried out without undue delay. At times, however, it is advantageous to effect a conversion of the alkali metal thiocarbonate salt to salt which is more stable, or which is a more reactive intermediate. For example, aluminum thiocarbonate of the substrate is prepared by passing an aluminum sulfate or aluminum acetate solution through, about, or over an alkali metal thiocarbonate of the polymeric substrate. The zinc thiocarbonate of the substrate is prepared from zinc chloride or some other soluble zinc salt, zirconyl thiocarbonate from zirconium oxychloride, uranyl thiocarbonate from uranyl acetate, lead thiocarbonate from lead acetate, and ferrous thiocarbonate from ferrous ammonium sulfate or ferrous chloride, etc. This technique is especially useful when a soluble hydroxide or basic salt of the desired cation is non-existent or unavailable.

The thioated substrate, when graft polymerized with the monomer, must be substantially free from any water-soluble by-products of the thioate formation or thioate substrate decomposition, i.e., decomposition of thioate groups, which are known in the art to be labile. Thus, after its formation the thioated substrate, in the form of an alkali metal salt, alkaline earth metal salt, or an ammonium salt, or the previously described converted metal salts, is washed with water to remove water-soluble reaction by-products and free metal ions, preferably immediately prior to its suspension in an emulsion or solution of the polymerizable ethylenically unsaturated monomer to ensure no further formation of by-products prior to polymerization.

The structures of the thioated substrates are not certain. However, in the case of the monothiocarbonate derivatives, they are believed to have the formula

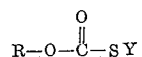

or its disproportionated or rearranged moiety, e.g.,

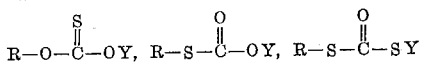

in which R is the polymer substrate and Y is hydrogen or a salt derivative of the acid. Similarly, in the case of the dithiocarbonates, they are believed to have the formula

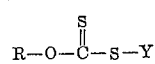

or its disproportionated or rearranged moiety, e.g.,

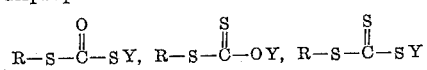

wherein R and Y have the values given above. Thus, in the case of dithiocarbonated cellulose and amylosic substrates, the anhydroglucose unit is believed to have the formula:

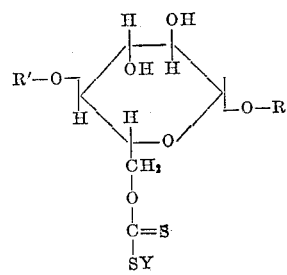

in which R or R' above may be hydrogen, anhydroglucose units of the type shown above or a mixture of anhydroglucose and thioated anhydroglucose units and Y has the value given above. The dithiocarbonate group need not necessarily be at the sixth position in the anhydroglucose ring and attachment elsewhere comes within the scope of this invention. This reactive intermediate, therefore, is called a "dithiocarbonate derivative of an anhydroglucose unit." Again, it is emphasized that while the above formula may represent the dithiocarbonate substitution as postulated, the actual substitution of the dithiocarbonate may be entirely different from the above depicted structure. The only limitation is that the anhydroglucose dithiocarbonate used is comparable to the reaction product of an anhydroglucose unit with carbon disulfide.

B. *Polymerization*

Graft polymerization is accomplished by reacting the thioate derivative of the substrate, either as a salt or the corresponding free acid obtained by converting an ammonium, organic ammonium, sulfonium, phosphonium, arsonium, stibonium, or an alkali metal salt of the thiocarbonate derivative to the free thiocarbonic acid derivative, with an ethylenically unsaturated monomer or monomers from one of the groups set out above in the presence of a peroxidic free radical initiator.

The copolymerization reaction is conducted in either an aqueous or nonaqueous system, but preferably and ordinarily in an aqueous system, in which the monomer is uniformly distributed. When the reaction medium is aqueous, a solution, suspension, or an emulsion of the ethylenically unsaturated monomer can be used to achieve uniform distribution of the monomer. The presence of a wetting agent in the reaction medium is advantageous since it facilitates monomer penetration into the thioate substrate. Emulsifiers can be used to achieve a uniform emulsion of an insoluble monomer and/or peroxidic initiator.

The selected thiocarbonate salt or free acid can be used in virtually any proportion to the monomer, e.g., from about 0.5 percent to 99.9 percent by weight based on the ethylenically unsaturated monomer. The monomer can also be used in almost any concentration in the solution, e.g., from about 1 percent to about 100 percent of the total reaction solution. The solution can be buffered, if necessary, or its pH adjusted to provide the best polymerization conditions for the selected monomers. After adding a water soluble peroxidic free-radical initiator to the solution containing the substrate and monomer, the reaction will proceed at virtually any temperature, e.g., from about 0° to about 100° C. Reaction times can vary from 3 minutes to about 96 hours or longer and reaction pressure can be atmospheric, subatmospheric or superatmospheric, depending upon the monomer and the type of product desired. The thioated substrate can also be added to a mixture of the monomer and peroxidic initiator in the selected reaction media. The usual graft polymerization techniques employing a peroxidic initated system can be used. However, because of the ease of graft polymerization, less rigorous conditions are ordinarily required. For example, mildly acidic aqueous conditions at room temperature are sufficient to achieve any degree of monomer add-on desired, e.g., from 5 percent to 500 percent.

As is well known in the art, the properties of the graft polymer produced depends upon the substrate used, the monomer or mixture of monomers used, the percent of add-on of monomer achieved, and the reaction conditions employed.

The graft polymers are unique in that in contradistinction to heretofore produced graft polymers, there appears to be a multiplicity of polymer groups of a relatively low order of molecular weight, e.g., 10,000 to 50,000, grafted to the substrate instead of a fewer number of polymer groups of a high molecular weight, e.g., 250,000 or higher.

The graft polymer can, if desired, be purified using conventional techniques, e.g., to remove sulfur containing products, monomer, homopolymer, alkali, etc.

In the practice of this invention, it is possible to design the final macromolecular products so that they have a wide range of properties by controlling the extent or degree to which thiocarbonate groups have been added to the polymeric substrate. For example, it is possible to introduce a few thiocarbonate groups per polymer molecule by merely reacting a very small percentage of the reactive sites present in the polymeric substrate with carbonyl sulfide or carbon disulfide; on the other hand, all or nearly all of the reactive sites may be converted to thiocarbonate groups. It is preferred, however, that the degree of thiocarbonation be such that there is no apparent outward change in the physical form of the thiocarbonated derivative, nor that the thiocarbonate derivative becomes soluble in water. Also, all or substantially all water-soluble by-products arising from the thiocarbonation reaction ought be removed prior to the copolymerization, e.g., by washing. The thiocarbonate substrate may be used in the subsequent polymerization step either as the half ester of thiocarbonic acid, or as a salt of the half ester of thiocarbonic acid. The salt may be that of any of the metallic elements of the Periodic Table as well as ammonia. In addition, the salt may be that of an organic species which possess a positive charge, such as the organic ammonium, phosphonium, sulfonium, arsonium and stibonium groups. The metal ions may be monovalent or multivalent, and if the metal ion is in a lower valence state, e.g., $Fe^{++}$, it makes an excellent contribution to the redox system.

Because of thiothete groups of the substrate are unstable, it is preferred that the graft polymerization process be part of a multiple step process comprising (a) forming the thioated substrate, (b) washing the substrate with water to remove the water-soluble by-products of the thioate step, and (c) mixing the freshly washed thioated substrate with the monomer-peroxidic initiator solution to initiate polymerization. Homopolymer formation can sometimes be significantly reduced by employing these steps as part of an uninterrupted sequence, at least the washing and polymerization steps.

*Graft polymerization of thioated cellulose and amylosic substrates*

When using cellulose substrates, the procedures known in the art for producing a water-insoluble thioated derivative can be followed. Use of aqueous sodium hydroxide of up to about 3 molar concentration is preferred, desirably about 0.1 to 1.5 molar. However, any base or basic salt whose aqueous solution has a pH of about 9 or greater may be used. The pH of the monomer solution can vary from below 1.0 to about 8. Preferably it is buffered in the range of about 1 to 7, more desirably from 1.0 to 5.0. Conversions of monomer to polymer at ambient temperature from 30 to 100 percent can readily be achieved with most monomers, of which a majority and in many cases all are graft polymer.

Because the amylosic substrates can readily become solubilized, precautions must be taken to be certain the substrate does not become solubilized during or after thioate formation or during graft polymerization. Thus, unpasted, i.e., non-solubilized, starches are used, usually at or near ambient temperatures, to produce the thioated derivative. Sodium hydroxide solutions of up to about 2 molar can be used but preferably much more dilute, e.g., 0.1 molar or less, are used. The alkaline agents of comparable basicity can also be used. Care must be taken to be certain the uptake of alkali is not so great as to result in the production of a soluble thioated derivative.

Using dithiocarbonate group-containing regenerated cellulose as a substrate, it is possible to produce graft-polymerized rayon as part of a modified viscose rayon process. In such a modified process, freshly regenerated cellulose filaments from pot spinning, bobbin or spool spinning or a filament from a continuous spinning process are equally applicable. While freshly formed cake from a pot spinner and bobbins or spools from a bobbin spinner may be copolymerized with a polymerizable monomer in batches, filament from a continuous spinning unit may be copolymerized with the polymerizable monomer continously as it is formed as a sequence in the overall rayon manufacturing process.

This process is not limited to dithiocarbonate containing regenerated filaments. Dithiocarbonate containing cellophane copolymerizes equally as well with polymerizable ethylenically unsaturated monomers.

In the process of rayon graft polymerization, regenerated cellulose containing residual dithiocarbonate groups is employed. The necessary residual dithiocarbonate group can be retained by limiting the prior art means used in rayon production to eliminate residual dithiocarbonate groups, e.g., by limiting regenerated filament exposure time to the viscose regenerating bath, and/or limiting the acidity of or controlling the temperature of the bath. Because residual dithiocarbonate groups are present in the freshly formed rayon, relatively little modification of the regeneration step is required to ensure retention of an adequate number of groups.

The generated cellulose, which is no longer water or alkali soluble but which contains dithiocarbonate groups, is then washed with water alone to ensure complete or substantially complete removal of soluble by-products and excess acid from viscose process, or a dilute alkali wash to convert any free dithiocarbonic acid groups to their sodium salt, or metathetically converted to another salt. The washed, dithiocarbonate group-containing regenerated cellulose is then passed into a solution or uniform dispersion of the selected monomer containing the peroxidic initiator and maintaining in the solution until the desired pick-up is achieved. The graft-polymerized regenerated cellulose can then be passed into a further washing bath to remove monomer, soluble salts, catalyst, homopolymer, sulfur-containing by-products, etc., and thereafter processed in the customary manner.

In order to describe the present invention so that it may be more clearly understood, the following examples are set forth in which all parts are expressed in parts by weight unless otherwise stated. These examples are set forth primarily for the purpose of illustration, and any specific enumeration of detail contained therein should not be interpreted as a limitation on the concept of this invention.

*Example 1a*

Ten parts of dry, defibered, bleached southern pine sulfate pulp were placed in a beaker and enough 0.25 M sodium silicate solution was added to cover the pulp completely. This mixture was allowed to stand at room temperature for about ¼ hour and then filtered on a Büchner funnel to such a dryness that the alkaline-wet pulp retained at least 100% of its weight of sodium silicate solution.

The alkaline-wet cellulose pad was crumbled and placed in an evacuated vacuum desiccator over carbon disulfide. After about 2 hours, the dithiocarbonated pulp crumbles were placed evenly on a Büchner funnel and washed with water (300–350 parts) in order to remove completely all soluble products which had formed during the dithiocarbonation process. After washing, the dithiocarbonated pulp was uniformly dispersed in a previously prepared emulsion consisting of 9 parts of styrene, 1 part of acrylonitrile, 300 parts of water, 1.0 Tween-85 (a polyoxyethylene sorbitan trioleate) and 2.5 parts of 30% hydrogen peroxide. Upon standing at room temperature for 24 hours, the pulp was removed from the polymerization mixture and thoroughly washed with water. The dried product weighed 17.85 parts which constitute 89.6% of the theoretical. Prolonged extraction of this material with ethylene trichloride indicated that 69.2% of the monomer which had been converted to polymer could not be extracted.

*Examples 2a–7a*

Ten parts of dry defibered bleached southern pine sulfate pulp were defibered in a sufficient amount of various alkali and alkaline salt solution and each subjected to the dithiocarbonation and copolymerization process as described in Example 1a. The alkalies and alkaline salts used, as well as the results obtained, are tabulated below as Examples 2a–7a.

| Example | Alkaline Salt | Concentration of Alkaline Solution | Percent Yield of Theoretical | Percent Polymer Nonextractable |
|---|---|---|---|---|
| 2a | Sodium Hydroxide | 0.5 M | 84.3 | 44.2 |
| 3a | Sodium Sulfide | 0.25 M | 88.5 | 50.5 |
| 4a | Sodium Cyanide | 0.25 M | 79.0 | 78.4 |
| 5a | Sodium Aluminate | 0.25 M | 87.3 | 78.0 |
| 6a | Sodium Carbonate | 0.25 M | 75.0 | 68.5 |
| 7a | Ammonium Sulfide | 0.25 M | 62.5 | 86.1 |

*Example 8a*

Ten parts of bleached southern pine sulfate pulp were defibered in sufficient 0.25 M sodium silicate solution and then filtered on a Büchner funnel to such a dryness that the alkaline-wet pulp retained at least 100% of its weight of sodium silicate solution. This alkaline-treated pulp was dithiocarbonated by placing it in an atmosphere of carbon disulfide for ½ hour, as described in Example 1a, and then suspended in an emulsion consisting of 10 parts of ethyl acrylate, 300 parts of water, 0.5 part of Tween 85 and 2.5 parts of 30% hydrogen peroxide.

After standing for 19 hours at room temperature, the pulp was removed and washed well with water. Upon drying the product weighed 17.4 parts, which constitute an 87.3% yield of the theoretical. Extraction with acetone revealed that 74.3% of the monomer which had been converted to polymer was nonextractable.

*Example 9a*

Ten parts of bleached southern pine sulfate pulp were treated as described in Example 8a and suspended in an emulsion prepared from 9 parts of acrylonitrile, 300 parts of water, 0.5 parts Tween 85 and 2.5 parts of 30% hydrogen peroxide. After 19 hours at room temperature, the product was washed well with water and dried. The product weighed 14.98 parts which constitute a 79% yield of theoretical. Prolonged extraction with dimethyl formamide indicated that 75.3% of the monomer which had been converted to polymer was nonextractable.

*Example 10a*

Ten parts of bleached southern pine sulfate pulp were treated as described in Example 8a and suspended in a solution of 10 parts of acrylamide, 100 parts of water and 3.5 parts of 30% hydrogen peroxide. After standing 19 hours at room temperature, the product was dispersed in three liters of warm water and filtered with suction onto a 100 mesh Monel metal screen. After washing well with water and drying, the product weighed 13.54 parts which constitute a 67.6% yield of the theoretical of which substantially all of the monomer converted to polymer was unextractable.

*Example 11a*

Alkaline pulp was prepared from 10 parts of bleached southern pine sulfate pulp by soaking it in a sufficient amount of 0.25 M sodium aluminate solution to cover it, then dithiocarbonated as described in Example 1a. This pulp was then dispersed in an emulsion consisting of 10 parts of ethyl acrylate, 300 parts of water, 0.5 part of Tween 85 and 2.5 parts of 30% hydrogen peroxide. After standing for 25 hours at room temperature, the pulp was removed from the polymerization medium and thoroughly washed with water. Upon drying, the product weighed 17.75 parts. This constituted an 89% yield of the theoretical and 75.3% of the monomer which had been converted to polymer was nonextractable with acetone.

*Example 12a*

Ten parts of bleached southern pine sulfate pulp were dithiocarbonated as described in Example 1a, whereby immediately after washing the dithiocarbonated pulp with water and without removing the pulp from the Büchner funnel, 100 parts of 0.06 M lead acetate solution were passed through the fiber pad, followed at once by water (150–200 parts) to remove excess lead ions. The lead cellulose dithiocarbonate thus formed was added to an emulsion of styrene/acrylonitrile as described in Example 1a and allowed to stand at room temperature for 24 hours. The pulp was filtered and washed thoroughly with water. Upon drying, the product weighed 17.7 parts which constitute an 88.7% yield of the theoretical. Prolonged extraction of the product in ethylene trichloride indicated that 81% of the monomer which had been converted to polymer could not be extracted.

Example 13a

Ten parts of dry, bleached pine sulfate pulp were defibered in a sufficient amount of 2% methylamine solution and then filtered on a Büchner funnel to such a degree of dryness that the pulp retained at least 100% of its weight of the amine solution. The amine-treated pulp was then dithiocarbonated as described in Example 1a and the resultant pulp washed well with about 300 parts of water followed by 100 parts of 0.06 M aluminum acetate solution. The thus formed aluminum cellulose dithiocarbonate was washed well with 150 parts of water, then uniformly dispersed in an emulsion such as that described in Example 1a.

After standing 24 hours at room temperature, the pulp was removed and washed well with water and dried. The product weighed 16.6 parts which constitute an 83% yield of the theoretical and of which 67.8% was nonextractable in ethylene trichloride.

Example 14a

Ten parts of bleached southern pine were dithiocarbonated and copolymerized as described in Example 8a.

After standing 2⅓ hours at room temperature, the pulp was filtered and washed thoroughly with water. Upon drying, the product weighed 17.7 parts which constituted an 88.5% yield of the theoretical. Extraction with acetone revealed that 80.0% of the monomer which had been converted to polymer was nonextractable.

Example 15a

Ten parts of bleached southern pine were dithiocarbonated and copolymerized as described in Example 8a with the exception that 1 part of 10% sulfuric acid was added to the emulsion.

After standing 1⅓ hours at room temperature, the pulp was filtered and washed thoroughly with water and dried. The product weighed 17.90 parts which constituted an 89.5% yield of the theoretical and of which 67.0% was nonextractable in acetone.

Example 16a

Alkaline pulp was prepared from 10 parts of bleached southern pine sulfate pulp by soaking it in a sufficient amount of 0.25 M ammonium sulfide solution, then dithiocarbonated as described in Example 1a; the resultant pulp was washed well with about 300 parts of water followed by 100 parts of 0.06 M cobaltous chloride solution. The thus formed cobaltous cellulose dithiocarbonate was washed well with about 100 parts of water, then uniformly dispersed in an emulsion such as that described in Example 1a.

After standing for 22 hours at room temperature, the pulp was removed from the polymerization medium and washed thoroughly with water and dried. The product weighed 15.9 parts which consituted a 79.6% yield of the theoretical and of which 85.2% was nonextractable.

Example 17a

Five parts of mercerized cotton were placed in enough 0.25 M sodium silicate solution to cover the cotton completely. This mixture was allowed to stand at room temperature for about ½ hr. and then filtered on a Buchner funnel to such a dryness that the alkaline-wetted cotton retained at least 100% of its weight of sodium silicate solution.

The alkaline-wet cotton was placed in an evacuated vacuum desiccator over carbon disulfide for 3 hours, after which the dithiocarbonated cotton was placed on a Büchner funnel and washed thoroughly with water and then added to a previously-prepared emulsion consisting of 4.0 parts of acrylonitrile, 150 parts of water, 0.5 part of Tween 85 and 1.25 parts of 30% hydrogen peroxide.

After standing at room temperature for 20 hours, the cotton was removed and washed well with water. Upon drying the product weighed 6.67 parts which constituted a 74.0% yield of the theoretical. Prolonged extraction in dimethyl formamide indicated 76.0% of the monomer which had been converted to polymer could not be extracted.

Example 18a

Ten parts of unbleached groundwood were dithiocarbonated as described in Example 17a to form a sodium groundwood dithiocarbonate. The resultant dithiocarbonated groundwood was washed well with about 300 parts of water, then treated with 100 parts of 0.06 M ferrous ammonium sulfate solution followed at once with water (150–200 parts) to remove excess ferrous ions. The ferrous groundwood dithiocarbonate was added to a solution containing 10 parts acrylamide, 200 parts of water and 2.5 parts of hydrogen peroxide.

After standing 20 hours at room temperature, the product was dispersed in 1.5 liters of warm water and filtered. The product was thoroughly washed with water and dried. The product weighed 15.0 parts which constitute a 75.0% yield of the theoretical of which all of the monomer converted to polymer was unextractable.

Example 19a

Cotton cloth (3.9 parts) was dithiocarbonated as described in Example 1a, then suspended in an emulsion consisting of 5.0 parts of ethyl acrylate, 350 parts of water, 0.5 part of Tween 85 and 2.5 parts of 30% hydrogen peroxide.

Upon standing for 18 hours at room temperature, the product was washed with water and dried. The product weighed 6.5 parts which constituted a 73% yield of the theoretical. Prolonged extraction with acetone indicated that 81% of the monomer which had been converted to polymer could not be extracted.

Example 20a

Fifteen parts of dry defibered West Coast bleached sulfite pulp were placed in enough 0.125 M sodium hydroxide solution to cover the cellulose completely. The mixture was allowed to stand at room temperature for about ½ hour and then filtered on a Büchner funnel to such a dryness that the alkali-wetted cellulose retained at least 100% of its weight of alkali solution. The alkali-wet cellulose was dithiocarbonated as described in Example 1a. This dithiocarbonated pulp was then dispersed in an emulsion consisting of 15 parts of 2-cyanoethylacrylate, 500 parts of water, 14 parts of Beckman 3581 pH 7.0 concentrated buffer solution, 0.5 part of Tween 85 and 30 parts of 1% ammonium persulfate solution. Upon standing at room temperature for 24 hours, the product was removed from the polymerization mixture and thoroughly washed with water. The dried material weighed 27.2 parts which constitute a 90.5% yield of the theoretical. Prolonged extraction repeatedly with acetone and dimethylformamide showed a weight loss of about 16%, the remainder being incapable of removal by extraction.

Example 21a

Fifteen parts of West Coast bleached sulfite were dithiocarbonated as described in Example 20a, whereby immediately after washing the dithiocarbonated pulp with water, and without removing the pulp from the Büchner funnel, 25 parts of M/4 ferrous ammonium sulfate solution were passed through the fiber pad to form the ferrous dithiocarbonate by metathesis, followed at once by water (150–200 parts) to remove excess ferrous ions. This ferrous cellulose dithiocarbonate was added to an emulsion of 2-cyanoethylacrylate as described in Example 20a and allowed to remain suspended in this emulsion for about 3 hours. Filtration, followed by washing and drying of the product showed a yield of 29.0 parts. This constituted a 93.5% conversion of monomer to polymer on the pulp. Extraction of the above product with dimethylformamide (or acetone) showed no loss in weight.

Example 22a

Fifteen parts of bleached southern pine sulfate pulp were dithiocarbonated and then ferrated to form the ferrous dithiocarbonate as described in Example 21a. Immediately after the pulp had been ferrated and washed, it was suspended in an emulsion prepared from 500 parts water, 14 parts styrene, 1 part acrylonitrile, 1 part Tween 85, 25 parts M/20 potassium acid phthalate, and 2.5 parts of 30% hydrogen peroxide. After 24 hours the pulp was washed with water and dried. The product yield amounted to 29.3 parts which constitute a 95% conversion of monomer to polymer. Prolonged extraction with trichloroethane showed a 20% loss in weight indicating 75% of the polymer formed was bound to the cellulose.

Example 23a

An alkali-wet pulp was prepared from 15 parts of bleached southern pine sulfate pulp by soaking it in a sufficient amount of 0.25 M sodium hydroxide solution, then dithiocarbonated and ferrated in order to form the ferrous dithiocarbonate as described in Example 21a. This pulp then was dispersed in an emulsion consisting of 500 parts of water, 15 parts of acrylonitrile, 20 parts of M/20 potassium hydrogen phthalate, 0.5 part of Tween 85 and 2.5 parts of 30% hydrogen peroxide. After 48 hours, the product was washed with water and dried. The yield obtained amounted to 22.2 parts which constitute a 48% conversion of monomer to polymer. Prolonged extraction (64 hours) in dimethylformamide showed no loss in weight.

Example 24a

Fifteen parts of bleached gum sulfate pulp were dithiocarbonated and ferrated to form the ferrous dithiocarbonate as described in Example 21a and then added to an emulsion consisting of 500 parts of water, 15 parts of laurylmethacrylate, 0.5 part Tween 85, 30 parts of M/20 potassium hydrogen phthalate, 0.2 part t-butyl hydroperoxide, and 2.5 parts of 30% hydrogen peroxide. After 24 hours, the product was filtered and washed with water. Upon drying, the yield amounted to 21.8 parts. Prolonged extraction with dimethylformamide (or dimethylsulfoxide) showed no loss in weight. The conversion of monomer under these conditions was 45.3%, of which 100% was unextractable.

Example 25a

Fifteen parts of bleached southern pine were dithiocarbonated and ferrated to form the ferrous dithiocarbonate as described in Example 21a, then dispersed in a solution consisting of 150 parts of water, 15 parts of acrylic acid, sufficient triethanol amine (or 10% sodium hydroxide solution) to adjust the pH of the solution to pH 4.0, and finally 2.5 parts of 30% hydrogen peroxide. After 24 hours, the product was acidified with hydrochloric acid (pH 2.5) and filtered. The fiber was then washed with 0.25% hydrochloric acid, followed by water until the filtrate was free of chloride ions. The yield from this polymerization was 19.8 parts which constitute a 32% conversion of monomer to unextractable polymer.

Example 26a

Fifteen parts of bleached southern pine sulfate pulp were dithiocarbonated as in Example 21a, but upon removal of the pulp from the atmosphere of carbon disulfide, the pulp crumbles were spread out on a table and exposed to the atmosphere until the yellow coloration vanished (about 4 hours). At this point the pulp was suspended in about 800 parts of water, filtered in a Büchner funnel and then washed with water. Immediately, the washed pulp was ferrated in order to form the ferrous thiocarbonate as in Example 21a and dispersed in a solution consisting of 150 parts water, 15 parts acrylamide, 25 parts M/20 potassium hydrogen phthalate, and 2 parts of 30% hydrogen peroxide. After 12 hours, the product was dispersed in three liters of water and filtered with suction onto a 100 mesh Monel metal screen. After washing well with water and drying, the yield amounted to 27.3 parts which constitute an 82% conversion of monomer to unextractable polymer.

Example 27a

Fifteen parts of unbleached groundwood were dithiocarbonated and ferrated to form the ferrous dithiocarbonate as described in Example 23a, then suspended in an emulsion consisting of 500 parts of water, 15 parts of glycidylmethacrylate, 0.5 part Tween 85, 20 parts M/20 potassium hydrogen phthalate, and 2.5 parts of 30% hydrogen peroxide. After 24 hours at room temperature, the product was washed with water and dried. The yield of product amounted to 28.6 parts which constitute a 91% conversion of monomer to polymer, none of which could be extracted with dimethylformamide or dimethylsulfoxide.

Example 28a

Into a 600 ml. beaker were placed 15 parts of excelsior with sufficient 0.365 M sodium hydroxide solution to completely cover the wood. After soaking the excelsior for 3 hours, the alkali liquor was removed by filtration and the moist excelsior was exposed to carbon disulfide vapors in a vacuum desiccator for about 3 hours. The dithiocarbonated wood was twice suspended in 100 parts of water and filtered. Immediately thereafter, the excelsior was suspended in 100 parts of M/15 ferrous ammonium sulfate solution for about one minute and then transferred to 100 parts of water. Finally, the ferrous dithiocarbonate excelsior was filtered, and washed with an additional 100 parts of water, then suspended in an emulsion consisting of 250 parts of water, 15 parts 2-cyanoethylacrylate, 0.2 part Tween 85, 15 parts Beckman 3581 pH 7.0 concentrated buffer solution, and 2.5 parts 30% hydrogen peroxide. Upon standing at room temperature for 24 hours, the excelsior was filtered free of the polymerization solution and washed with water. After air drying the product for 48 hours, the yield consisted of 27.5 parts. This constituted a 75% conversion of monomer to polymer on the excelsior of which all was unextractable since prolonged extraction with dimethylformamide showed no loss in weight.

Example 29a

In a 600 ml. beaker, 5.2 parts of white, mercerized cotton thread in the form of a skein were dithiocarbonated and ferrated to form the ferrous dithiocarbonate as described in Example 23a, then suspended for 24 hours in an emulsion prepared from 250 parts of water, 5 parts acrylonitrile, 20 parts M/20 potassium hydrogen phthalate, 0.2 part Tween 85, and 1 part 30% hydrogen peroxide. The skein was removed from the reaction medium and washed with water. A dry weight of the product showed a yield of 7.1 parts which constitutes a conversion of monomer to polymer of 38%. Extraction with dimethylformamide showed no loss in weight.

Example 30a

The dithiocarbonation and ferration procedure to form the ferrous dithiocarbonate as described in Example 21a was carried out on 15 parts of Blandon unbleached balsam fir sulfite pulp which was thereafter suspended in an emulsion composed of 500 parts of water, 15 parts styrene, 1 part Tween 85, 40 parts M/20 potassium hydrogen phthalate, and 2.5 parts 30% hydrogen peroxide. After 24 hours, the pulp was removed from the reaction medium and washed thoroughly with water. The dried product amounted to 26.2 parts which constitutes a 74.7% conversion of monomer to polymer. Extraction with dimethylformamide (or trichloroethylene) showed a weight loss of about 5%.

Example 31a

Fifteen parts of West Coast bleached sulfite pulp were dithiocarbonated as described in Example 20a. This sodium dithiocarbonate pad was then converted to manganous cellulose dithiocarbonate by substituting M/4 manganous nitrate for M/4 ferrous ammonium sulfate, as described in Example 21a, and suspended in an emulsion consisting of 500 parts of water, 20 parts M/20 potassium hydrogen phthalate, 15 parts 2-cyanoethylacrylate, 0.2 part Tween 85, 30 parts of 1% ammonium persulfate. After 93 hours at room temperature, the product was washed and dried. The yield of product amounted to 24.7 parts which lost 15% of its weight when extracted with dimethylformamide.

*Examples 32a–37a*

Fifteen parts of West Coast bleached sulfite pulp were dithiocarbonated as described in Example 20a and then converted to various cellulose dithiocarbonate salts. These dithiocarbonates were suspended in a polymerization mixture, as described in Example 31a, for 93 hours before being processed for yield. Some of the representative results obtained, using various metal dithiocarbonates are tabulated in the following table.

| Ex | M/4 Solutions | Particular Salts of Cellulose Dithiocarbonate | Percent Conversion of 2-cyanoethylacrylate Monomer to Polymer | Percent Polymer Not Extractable |
|---|---|---|---|---|
| 32a | Cobaltous Chloride | Cobaltous | 82 | 58.0 |
| 33a | Magnesium Acetate | Magnesium | 78 | 61.0 |
| 34a | Zirconium Oxychloride | Zirconium | 94 | 83.5 |
| 35a | Lead Acetate | Lead | 96 | 82.0 |
| 36a | Calcium Chloride | Calcium | 85 | 65.0 |
| 37a | Ferric Chloride | Ferric | 85 | 69.5 |

*Example 38a*

Twenty-five parts (oven dried) bleached southern pine sulfate pulp, in the form of dry lap, were completely covered with sufficient 0.25 M sodium hydroxide solution at 15° C. for about 15 minutes, then excess alkali solution was removed by passing the alkali-moist pulp dry lap through rubber pressure rollers under such a load so that the moist pulp dry lap weighed about 2½ times its original dry weight. This alkali-wet cellulose was placed in a vacuum desiccator over carbon disulfide and evacuated to about 600 mm. Hg pressure and maintained at 50° C. for about 2 hours. The resulting dithiocarbonate pulp was dispersed in 800 parts of water, filtered on Büchner funnel, and washed with 500 parts of water. After washing and while still on the Büchner funnel, 100 parts of 0.06 M ferrous ammonium sulfate hexahydrate solution were poured through and about the dithiocarbonated pulp, followed after about 1 minute, with about 800 parts of water to remove excess ferrous ions. The wet ferrous cellulose dithiocarbonate pulp weighed about 4 times the original weight of the dry pulp. This pulp was transferred to a two-liter capacity Parr pressure reaction vessel containing 40 parts M/20 potassium acid phthalate solution, 2 parts Tween 80 (polyoxyethylene sorbitan monooleate), 1 part n-dodecanethiol and 500 parts of water which had been sparged with nitrogen. The reaction vessel was sealed and, with the agitator in operation, 75 parts of butadiene, followed by a catalyst mixture consisting of ¼ part t-butylhydroperoxide, 5 parts 30% hydrogen peroxide, 2 parts ammonium persulfate dissolved in 20 parts of water, were added under pressure and the system raised to about 200 p.s.i. with nitrogen. The polymerization was allowed to progress for about 24 hours at 75° C. in which time the pressure of the system dropped to 140 p.s.i. The product was washed well with hot water followed by acetone, then air dried. The yield amounted to 29 parts.

*Example 39a*

Twenty-five parts (oven dried) bleached southern pine sulfate pulp in the form of dry lap were dithiocarbonated and ferrated to form the ferrous dithiocarbonate as described in Example 38a and then placed in a two-liter capacity Parr pressure reaction apparatus which contained 500 parts of water, 2 parts Tween 20 (polyoxyethylene sorbitan monolaurate), and 40 parts of pH 3.0 potassium hydrogen phthalate/hydrochloric acid buffer solution, all of which had been sparged with nitrogen. With agitation, 84 parts of vinyl chloride and a catalyst solution consisting of ¼ part 30% hydrogen peroxide, ¼ part t-butylhydroperoxide in 20 parts of water were added to the reaction apparatus under a pressure of 200 p.s.i. of nitrogen; and the mixture was allowed to react for 18 hours at about 32° C. In that time, the internal pressure of the reaction vessel dropped to 50 p.s.i. The product was washed well with hot water followed by acetone and air dried. The yield of fibrous material was 41.8 parts.

*Example 40a*

Ten parts of dry, defibered, bleached southern pine sulfate pulp were placed in sufficient 0.4 M sodium hydroxide solution to cover it completely. This mixture was allowed to stand at room temperature for a few minutes and then filtered on a Büchner funnel to such a dryness that the alkali-wetted cellulose pulp retained at least 100% of its weight of the sodium hydroxide solution. The alkali-wet cellulose pulp then was dithiocarbonated as described in Example 1a and the resultant sodium cellulose dithiocarbonate pulp washed well with water, followed by an excess of a 0.06 M solution of trimethylsulfonium iodide. The trimethylsulfonium cellulose dithiocarbonate pulp was washed well with water, then uniformly dispersed in an emulsion such as that described in Example 1a.

After standing for about 18 hours at room temperature, the pulp was removed from the polymerization medium and thoroughly washed with water. The dried product weighed 17.4 parts which constitute an 87.5% yield of the theoretical of which 66.3% was nonextractable.

*Example 41a*

Ten parts of bleached southern pine pulp which had been dithiocarbonated and converted to the trimethylsulfonium salt as described in Example 40a were suspended in an emulsion consisting of 10 parts of ethyl acrylate, 300 parts of water, 0.5 part of Tween 85 and 2.5 parts of 30% hydrogen peroxide.

After about 18 hours at room temperature, the product was washed well with water. The dried product weighed 17.1 parts which constitute an 85.5% yield of the theoretical. Prolonged extraction with acetone revealed that 77.0% of the monomer which had been converted to polymer was nonextractable.

*Example 42a*

Ten parts of bleached southern pine pulp were converted to trimethylsulfonium cellulose dithiocarbonate as described in Example 40a and then suspended in an emulsion prepared from 9.0 parts of acrylonitrile, 300 parts of water, 0.5 part Tween 85 and 2.5 parts of 30% hydrogen perioxide.

After standing at room temperature for about 18 hours, the pulp was removed from the polymerization medium and washed well with water. Upon drying, the product weighed 15.9 parts which constitute an 83.5% yield of the theoretical. Extraction with dimethylformamide indicated that 77.9% of the monomer which had been converted to polymer was nonextractable.

*Example 43a*

Ten parts of trimethylsulfonium cellulose dithiocarbonate pulp prepared as in Example 40a were dispersed in a solution consisting of 10 parts of acrylamide, 150 parts of water and 2.5 parts of 30% hydrogen perioxide solution.

After about 18 hours at room temperature, the product was dispersed in 3 liters of water and filtered through a 100 mesh metal screen in a Büchner funnel. After repeated washings with water, the dried product weighed 12.6 parts. This constitutes a 63.0% yield of the theoretical.

*Examples 44a–47a*

A number of 10-part samples of rayon, each in the form of a knitted sock, were suspended in an emulsion prepared from 1.2 parts of carbon disulfide, 2.5 parts of sodium hydroxide, 0.2 part Triton X-155 (Rohm & Haas—alkylanylpolyether alcohol) and 250 parts of water. After 15 minutes, the resultant dithiocarbonated socks were filtered on a Büchner funnel and washed thoroughly with water in order to remove completely all soluble products which had formed during the dithiocarbonation process. Immediately after washing, these dithiocarbonated rayon socks were suspended for about 1 minute in 200 parts of 4% aqueous tetrakis (hydroxymethyl) phosphonium chloride sollution, then filtered on a Büchner funnel and washed thoroughly with water until free of excess reagent and water soluble by-products.

Each of the so prepared rayon socks was suspended in an emulsion prepared from 20 parts of a monomer, 0.8 part Tween 85, 477 parts of distilled water, and 3 parts 30% hydrogen peroxide. The reaction was terminated after 2½ hours at 50° by thoroughly washing the copolymeric product with water. The results obtained with some of the more readily obtainable commercial monomers are tabulated below:

| Ex. | Monomer System | Percent Conversion of Monomer to Polymer | Percent Nonextractable Polymer |
|---|---|---|---|
| 44a | Vinyl Acetate | 43 | 98 |
| 45a | Vinyl Acetate/Ethylacrylate, 1:1 Weight Ratio. | 71 | 97 |
| 46a | Vinyl Acetate/Styrene, 1:1 Weight Ratio. | 44 | 96 |
| 47a | Isoprene/Acrylonitrile, 3:1 Weight Ratio. | 30 | 100 |

*Examples 48a–51a*

A series of 10-part samples of scoured cotton sliver was prepared and reacted as described in Examples 44a–47a with the exception that other monomer systems were used. The monomers employed and the results of the copolymerization are listed below:

| Ex. | Monomer System | Percent Conversion of Monomer to Polymer | Percent Nonextractable Polymer |
|---|---|---|---|
| 48a | Styrene | 57 | 74 |
| 49a | Styrene/ethyl acrylate, 1:3 Weight Ratio. | 69 | 80 |
| 50a | Vinyl acetate/methyl methacrylate, 1:1 Weight Ratio. | 47 | 89 |
| 51a | Acrylonitrile/Methylmethacrylate | 53 | 77 |

*Examples 52a–57a*

A number of 10-part samples of scoured cotton silver were dithiocarbonated in a manner described in Examples 44a–47a. Immediately after washing, each sample of the sodium dithiocarbonated cotton sliver was suspended for about 1 minute in 300 parts of a 0.005% aqueous ferrous ammonium sulfate solution, followed by a thorough washing with distilled water and suspended in an emulsion prepared from 10 parts of a monomer, 0.8 part of Tween 85, 477 parts distilled water, and 3 parts of 30% hydrogen peroxide. The reaction was terminated after 2 hours at 50° C. by washing the product with water. The various monomers employed and the results of the copolymerizations are tabulated below:

| Ex. | Monomer System | Percent Conversion of Monomer to Polymer | Percent Nonextractable Polymer |
|---|---|---|---|
| 52a | Ethylacrylate/Styrene, 1:1 Weight Ratio. | 80 | 86 |
| 53a | Ethylacrylate/methyl methacrylate, 1:1 Weight Ratio. | 87 | 87 |
| 54a | Acrylonitrile/ethylacrylate, 1:1 Weight Ratio. | 65 | 90 |
| 55a | Vinyl acetate | 25 | 71 |
| 56a | Methyl Methacrylate/styrene, 1:1 Weight Ratio. | 88 | 80 |
| 57a | Styrene/acrylonitrile, 1:1 Weight Ratio. | 68 | 77 |

*Example 58a*

Ten parts of scoured rayon staple were suspended for about 15 minutes in an emulsion prepared from 4.6 parts carbon disulfide, 2.5 parts sodium hydroxide, 0.1 parts Triton X-155 and 243 parts of water. Immediately after dithiocarbonation and washing, the rayon staple was ferrated as described in Examples 52a–57a and suspended in an emulsion system consisting of 7.0 parts isoprene, 0.5 part Tween 85, 490 parts distilled water and 3 parts 30% hydrogen peroxide. The copolymeric product was removed from the reaction medium after 2 hours at 60° C. and washed well with water. Upon drying, the product weighed 14.5 parts which constitutes a 64% conversion of monomer to polymer.

*Example 1b*

Ten parts of dry, bleached pine sulfate pulp were defibered in sufficient 2% sodium hydroxide solution and then filtered on a Büchner funnel to such a dryness that the alkali-wet pulp retained at least 100% of its weight of alkali solution. This alkaline cellulose pad was then crumbled and placed in a gas drying tower, the outlet of which led to a mercury reservoir so that a slight gas pressure could be maintained within the drying tower. The inlet port of the drying tower was connected to a cylinder of carbonyl sulfide and sufficient carbonyl sulfide was flushed through the system to displace the air and to maintain a slight pressure to the atmosphere of carbonyl sulfide remaining over the alkaline pulp. After about fifteen minutes of exposure to the carbonyl sulfide, the sodium cellulose anhydroglucose monothiocarbonate was washed well with about 300 parts of water, then uniformly dispersed in a previously prepared emulsion consisting of 300 parts of water, 9 parts of styrene, 1 part of acrylonitrile, 0.5 part Tween 85 (a polyoxyethylene sorbitan trioleate) and 3 parts of 30% hydrogen peroxide.

After remaining at room temperature for 24 hours, the pulp was removed from the polymerization medium and thoroughly washed with water. Upon drying, the product weighed 16.2 parts. This constituted an 80.5% yield of the theoretical. Prolonged extraction of this material with ethylene trichloride indicated that 85.3% of the monomer which had been converted to polymer could not be extracted.

Example 2b

Ten parts of dry, bleached pine sulfate pulp were defibered in sufficient 1% sodium hydroxide solution and then filtered on a Büchner funnel to such a dryness that the alkali-wet pulp retained at least 100% of its weight of alkali solution. This alkaline cellulose was then thiocarbonated as in Example 1b. The resultant sodium cellulose anhydroglucose monothiocarbonate was then washed well with about 300 parts of water followed by 25 parts of 0.25 M lead acetate solution which had been diluted with 75 parts of water. The lead cellulose anhydroglucose monothiocarbonate pulp was washed with about 150 parts of water, then uniformly dispersed in an emulsion such as that described in Example 1b.

After standing at room temperature for 24 hours, the pulp was removed from the polymerization medium and thoroughly washed with water. Upon drying, the pulp weighed 16.7 parts which constituted an 83.5% yield of the theoretical. Repeated extractions with ethylene trichloride indicated that 90.3% of the monomer which had been converted to polymer could not be extracted.

Example 3b

Ten parts of dry, bleached pine sulfate pulp were defibered in sufficient 4% sodium hydroxide solution and then filtered on a Büchner funnel to such a dryness that the alkali-wet pulp retained at least 100% of its weight of alkali solution. This alkaline cellulose was then thiocarbonated as described in Example 1b and the resultant product was washed well with about 300 parts of water followed by 25 parts of 0.25 M aluminum acetate solution which had been diluted with 75 parts of water. The aluminum cellulose anhydroglucose monothiocarbonate product was washed with about 150 parts of water then uniformly dispersed in a previously prepared emulsion consisting of 300 parts of water, 10 parts of ethylacrylate, 0.5 part Tween 85 and 3 parts of 30% hydrogen peroxide.

After 24 hours at room temperature, the pulp was removed from the polymerization medium and thoroughly washed with water. Upon drying, the pulp weighed 14.9 parts. This 74.5% of the theoretical yield and repeated extractions with dimethylformamide indicated that 66.2% of the monomer which had been converted to polymer could not be extracted.

Example 4b

Ten parts of bleached West Coast sulfite pulp were treated as described in Example 2b to form the thiocarbonated pulp. The resultant thiocarbonated sulfite pulp was washed well with about 300 parts of water then treated with 100 parts of 0.06 M ferrous ammonium sulfate solution. The ferrous cellulose anhydroglucose monothiocarbonate was washed with about 150 parts of water then uniformly dispersed in an emulsion consisting of 300 parts of water, 10 parts of 2-cyanoethylacrylate, 10 parts of Bechman 3581 pH 7.0 buffer solution, 0.5 part of Tween 85, and 30 parts of 1% ammonium persulfate solution.

After remaining for 24 hours at room temperature, the pulp was removed from the polymerization medium and thoroughly washed with water. Upon drying, the product weighed 18.8 parts which constituted a 94% yield of the theoretical. Extraction with acetone revealed that 91.3% of the monomer which had been converted to polymer could not be extracted.

Example 5b

Ten parts of dry, bleached pine sulfate pulp were defibered in sufficient 1.5% triethylamine solution and then filtered on a Büchner funnel to such a dryness that the amine-wetted pulp retained at least 100% of its weight of amine solution. This pulp was then placed in a gas drying tower, then treated and copolymerized as described in Example 1b.

After standing at room temperature for 24 hours, the pulp was removed from the polymerization medium and thoroughly washed with water. Upon drying, the pulp weighed 15.1 parts which constitutes a 75.5% yield of the theoretical. Extraction with ethylene trichloride showed 81.3% of the monomer which was converted to polymer was nonextractable.

Example 6b

Ten parts of dry, bleached pine sulfate pulp were defibered in sufficient 1.5% sodium hydroxide solution and then filtered on a Büchner funnel to such a dryness that the alkali-wet pulp retained at least 100% of its weight of alkali solution. This alkali-treated pulp was then thiocarbonated and ferrated as described in Example 4b and suspended in a solution consisting of 100 parts of water, 10 parts of acrylamide, 30 parts of N/20 potassium acid phthalate solution and 2.5 parts of 30% hydrogen peroxide.

After standing at room temperature for about 24 hours the pulp was removed from the polymerization medium and thoroughly washed with water. Upon drying, the pulp weighed 16.0 parts which constituted an 80% yield of the theoretical of which 100% was nonextractable.

Example 7b

Ten parts of dry, bleached pine sulfate pulp were defibered in sufficient 3.0% sodium hydroxide solution and then filtered on a Büchner funnel to such a degree of dryness that the alkali-wet pulp retained at least 100% of its weight of alkali solution. This alkaline pulp was then thiocarbonated as described in Example 1b and the resultant pulp was then washed well with about 300 parts of water followed by 100 parts of 0.06 M zinc acetate solution. The resultant zinc cellulose anhydroglucose monothiocarbonate was washed well with about 150 parts of water, then uniformly dispersed in an emulsion such as that described in Example 1b.

After standing for 24 hours at room temperature, the pulp was removed and washed well with water. Upon drying, the pulp weighed 15.8 parts which constituted a 76% yield of the theoretical. Extraction with ethylene trichloride revealed that 82.7% of the monomer which had been converted to polymer was nonextractable.

Example 8b

Ten parts of bleached West Coast sulfite pulp were treated as described in Example 2b to form the triocarbonated fibers. The resultant product was washed well with about 300 parts of water, then with 100 parts of 0.06 M ferrous ammonium sulfate solution. The ferrous cellulose anhydroglucose monothiocarbonate was washed with about 150 parts of water then uniformly dispersed in an emulsion consisting of 300 parts of water, 10 parts of acrylonitrile, 0.5 parts of Tween 85, 35 parts of N/20 potassium hydrogen phthalate and 2.5 parts of 30% hydrogen peroxide.

After standing for 24 hours at room temperature, the pulp was removed from the polymerization medium and thoroughly washed with water. Upon drying, the product weighed 17.3 parts. This constituted an 86.5% yield of the theoretical, and 74% of the monomer which had been converted to polymer was nonextractable with dimethylformamide.

Examples 9b to 13b

Ten part samples of bleached pine sulfate pulp were defibered in a sufficient amount of various alkali and alkaline salt solutions and each then subjected to the thiocarbonation and copolymerization as described in Example 1b. The alkali and alkaline salts used, as well as the results obtained, are tabulated below as Examples 9b through 13b.

| Ex. | Alkaline Material | Conc. of Alkaline Solution | Percent Yield of Theoretical | Percent Polymer Nonextractable |
|---|---|---|---|---|
| 9b | Ammonium Hydroxide | 1.2 M | 79.5 | 79.2 |
| 10b | Sodium Silicate | 0.25 M | 89.0 | 77.4 |
| 11b | Sodium Sulfide | 0.25 M | 88.7 | 75.5 |
| 12b | Sodium Cyanide | 0.25 M | 70.8 | 76.3 |
| 13b | Sodium Carbonate | 0.43 M | 64.0 | 77.5 |

*Example 1c*

An aged viscose dope solution, prepared by the conventional industrial methods, containing 6.5% cellulose was pumped through a spinneret, which contained 150 holes of 0.004 in. diameter each, at the rate of 0.0016 gms./sec. into and through a 2-foot-long coagulating bath made up of 10% sulfuric acid, 13% sodium sulfate, 1% glucose, and 1% zinc sulfate. Upon emergence from the coagulating bath, the regenerated filamentous rayon derivative was allowed to fall into an aqueous bath consisting of a saturated solution of sodium carbonate. After about 15 minutes in the alkaline bath, the yield of 1.5 parts of coagulated filaments was filtered on a Büchner funnel and washed well with water (approximately 200–300 parts) in order to remove all interfering, soluble by-products present on the filaments. After washing, the regenerated cellulose, which still contains thiocarbonate groups, was suspended in an emulsion consisting of 7.5 parts of styrene, 1.5 parts of acrylonitrile, 40 parts of water, 2.0 parts Tween–85 (a polyoxyethylene sorbitantrioleate) and 3.0 parts of 30% hydrogen peroxide. Upon standing at ambient temperature for 18 hours, the copolymerized regenerated cellulose was removed from the reaction medium and washed thoroughly with water. Oven dried, this product weighed 7.8 parts which constitutes a 69.5% conversion of monomer to polymer. Prolonged extraction of the product with trichloroethane indicated that 82.5% of the monomer which had been converted to polymer was nonextractable.

*Example 2c*

Aged viscose dope solution was spun and regenerated in the manner described in Example 1c to yield 1.5 parts of thiocarbonate containing regenerated cellulose which was washed thoroughly and suspended in a solution consisting of 10 parts acrylic acid, 40 parts of water and 3.0 parts of 30% hydrogen peroxide. After 18 hours of contact with this solution at about 25° C. the regenerated cellulose copolymer was removed from the polymerization solution, washed well and oven dried yielding 6.6 parts of copolymer which constitutes a 50% conversion of monomer to nonextractable polymer.

*Example 3c*

Enough aged viscose dope solution was spun and regenerated as described in Example 1c to yield 1.5 parts of the thiocarbonate containing regenerated cellulose which was collected, washed well, and suspended in an emulsion prepared from 9.3 parts of ethyl acrylate, 0.5 parts of Tween–85, 40 parts of water and 3.0 parts of 30% hydrogen peroxide. After standing 18 hours at room temperature in contact with the above emulsion, the copolymerized regenerated cellulose was removed from the polymerization mixture and washed thoroughly with water. The product, oven dried, weighed 8.2 parts which is a 72.5% conversion of monomer to polymer. Prolonged extraction of this product with acetone indicated that 65.0% of the monomer which had been converted to polymer was nonextractable.

*Example 4c*

Enough aged viscose dope solution was spun and regenerated as described in Example 1c to yield 1.5 parts of the thiocarbonate-containing regenerated cellulose which was collected, washed well, and then suspended in a solution consisting of 10 parts of acrylamide, 40 parts of water and 3.0 parts of 30% hydrogen peroxide. After an 18 hour reaction time at room temperature, the copolymerized regenerated cellulose was removed from the polymerization mixture and thoroughly washed with water. The product, oven dried, weighed 5.9 parts which constitutes a 59.0% conversion of monomer to unextractable polymer.

*Example 5c*

Enough aged viscose dope solution was spun and regenerated as described in Example 1c to yield 3.0 parts of the thiocarbonate-containing regenerated cellulose which was collected, washed well, and suspended in an emulsion consisting of 12.0 parts of acrylonitrile, 50 parts of water, 1.5 parts of Tween–85 and 3.0 parts of 30% hydrogen peroxide. After an 18 hour reaction time at room temperature, the product was washed thoroughly with water and dried. The yield of copolymer amounted to 7.9 parts, which constitutes a 40.3% conversion of monomer to polymer. Prolonged extraction of this product with dimethylformamide indicated that 73.5% of the monomer which had been converted to copolymer could not be removed.

*Example 6c*

Twenty-five parts of a viscose dope solution (6.5% cellulose) was slowly poured into a Waring blender, rotating at medium speed, and containing 6.0 parts sulfuric acid (98%) in 300 parts of a saturated sodium sulfate solution. The regenerated cellulose which resulted was filtered on a Büchner funnel and washed thoroughly with water (300–400 parts) in order to remove all soluble by-products which formed during the regeneration process. Immediately after washing, 100 parts of 0.06 M calcium nitrate solution were passed over and through the sodium thiocarbonate-containing, regenerated cellulose to form its calcium derivative by methathesis. The calcium-containing product, after washing with sufficient water (150–350 parts) to remove excess calcium ions, was added to an emulsion prepared from 9.3 parts of ethyl acrylate, 50 parts of water, 0.5 parts of Tween–85 and 3.0 parts of 30% hydrogen peroxide. After an 18 hour reaction time at room temperature (about 25° C.) with this emulsion, the regenerated cellulose copolymer was washed well with water and dried. The yield of copolymer amounted to 9.6 parts, which constitutes an 86.5% conversion of monomer to polymer. Prolonged extraction in acetone showed that 80.5% of the monomer which had been converted to copolymer could not be removed.

*Examples 7c–11c*

Twenty-five parts of a viscose dope solution (6½% cellulose) were coagulated and converted to various thiocarbonate-containing, regenerated cellulose salts by methathesis in the manner described in Example 6c. Each thiocarbonate-containing derivative was suspended for 18 hours in an emulsion consisting of 4.0 parts of acrylonitrile, 50 parts of water, 0.3 parts of Tween–85 and 3 parts of 30% hydrogen peroxide before being processed for yield. Some of the results, representative of the various salts used, are tabulated below:

| Example No. | Cation | Percent Conversion of Monomer to Polymer | Percent Nonextractable Polymer |
|---|---|---|---|
| 7c | Ferrous | 71.3 | 82.2 |
| 8c | Lead | 72.5 | 85.0 |
| 9c | Aluminum | 65.6 | 72.1 |
| 10c | Magnesium | 65.6 | 97.4 |
| 11c | Zinc | 63.6 | 9..4 |

*Examples 12c–16c*

Twenty-five parts of a viscose dope solution (6½% cellulose) was coagulated and converted to various thiocarbonate-containing, regenerated cellulose salts by metathesis in the manner described in Example 6c. Each thiocarbonate-containing derivative was suspended for 18 hours in an emulsion prepared from 4.9 parts of methyl acrylate, 0.3 part of Tween–85, 50 parts of water and 3.0 parts of 30% hydrogen peroxide before being processed for yield. Some of the results, representative of the various salts used, are tabulated below:

| Example No. | Cation | Percent Conversion of Monomer to Polymer | Percent Nonextractable Polymer |
|---|---|---|---|
| 12c | Ferrous | 56.7 | 78.4 |
| 13c | Lead | 57.7 | 74.5 |
| 14c | Aluminum | 63.7 | 74.0 |
| 15c | Magnesium | 71.0 | 73.7 |
| 16c | Zinc | 65.7 | 80.1 |

*Examples 17c–27c*

Enough aged viscose dope solution was spun and coagulated as described in Example 1c to yield a number of 1.5 part samples of thiocarbonate-containing cellulose yarn. Each such specimen was further treated in the manner described in Example 3c with the exception that a variety of monomers were substituted in place of ethyl acrylate. The results obtained with some of the more readily commercially obtainable monomers are tabulated below:

| Example No. | Monomer | Wt. of monomer used (gr.) | Percent conversion of monomer to polymer on substrate | Percent non-extractable polymer |
|---|---|---|---|---|
| 17c | n-Butyl acrylate | 12.0 | 34 | 79 |
| 18c | Glycidyl acrylate | 10.0 | 77 | 70 |
| 19c | 2-cyanoethylacrylate | 10.0 | 80 | 86 |
| 20c | Methacrylic acid | 8.0 | 40 | 100 |
| 21c | Methacrylamide | 8.0 | 45 | 100 |
| 22c | Methyl methacrylate | 9.3 | 61 | 75 |
| 23c | Ethyl methacrylate | 8.0 | 70 | 63 |
| 24c | Hydroxyethyl methylacrylate | 5.0 | 78 | 68 |
| 25c | Hydroxypropyl methacrylate | 10.0 | 63 | 68 |
| 26c | Glycidyl methacrylate | 9.3 | 66 | 75 |
| 27c | Vinylidene chloride | 10.0 | 35 | 87 |

The copolymeric product derived from vinylidene chloride showed outstanding fire-retardency, while that obtained from 2-cyanoethylacrylate showed improved resistance toward microbiological attack.

*Examples 28c–37c*

A number of samples of freshly regenerated thiocarbonate-containing cellulose was prepared and reacted as described in Example 7c with the exception that a variety of monomers were substituted in lieu of acrylonitrile. Ferration in these instances was accomplished immediately after washing by suspending each sample for about 1 minute in 50 parts of a 0.004% aqueous solution of ferrous ammonium sulfate, then washed and continued as directed. The following results, tabulated below, are representative of what is obtainable with commercially available monomers:

| Example No. | Monomer | Wt. of monomer used (gr.) | Percent conversion of monomer to polymer on substrate | Percent non-extractable polymer |
|---|---|---|---|---|
| 28c | Sodium p-styrene sulfonate | 10.0 | 41 | 100 |
| 29c | N,N-dimethylamino-ethyl acrylate | 12.5 | 51 | 100 |
| 30c | 2-ethylhexyl acrylate | 12.0 | 42 | 92 |
| 31c | Vinylidene chloride | 10.0 | 70 | 88 |
| 32c | Vinylchloride Co vinylidene chloride (50/50) | 10.0 | 62 | 91 |
| 33c | Vinyl acetate [1] | 8.0 | 60 | 85 |
| 34c | Isoprene [1] | 10.0 | 37 | 100 |
| 35c | Isoprene Co acrylonitrile (75–25) [1] | 10.0 | 53 | 100 |
| 36c | Styrene [1] | 8.0 | 95 | 90 |
| 37c | Vinyl toluene [1] | 10.0 | 70 | 90 |

[1] Polymerization conducted at 50° C. for 3 hours.

The copolymeric product arising from sodium p-styrene sulfonate and N,N-dimethylaminoethyl acrylate displayed excellent ion-exchange properties. Products resulting from vinylidene chloride and vinyl chloride Co vinylidene chloride was fire-retardant, while those from isoprene, isoprene Co butadiene, and styrene showed improved compatability with natural and synthetic rubber. Improved water-repellancy was observed in a 2-ethylhexyl acrylate copolymer of freshly regenerated cellulose.

The practicality of the products arising from the practice of this invention is immediately evident. Cellulosic materials with exceptional dimensional stability, improved electrical properties and resistance to bacterial degradation are prepared. In all cases, novel coatings and/or deep-seated impregnations of cellulosic materials can be achieved. Some novel cellulosic copolymers have specialized uses, such as fibrous or filamentous ion-exchange materials. When the copolymers are formed from monomers having acid moieties, such as acrylic acid, the copolymers are cation-active. When the copolymers are formed from monomers having amine moieties, such as methacrylic acid esters derived from amino alcohols as listed above, the copolymers are anion-active. The fibrous or filamentous nature of the ion-exchange active cellulose products makes them particularly attractive in such applications as in catamenial devices, both external and internal, and in metal ion scavengers, to name a few. The fibrous properties of some of these novel copolymers also are especially attractive in paper and non-woven fabric manufacture. A judicious choice of monomer or monomers allows for a variation of properties, such as water repellancy in case of a copolymer made from stearyl-methacrylate, or water absorbency if the copolymer is made from acrylic acid. In addition, copolymers derived from acrylic acid are highly hemostatic.

Select cellulosic copolymers, prepared by the processes disclosed here, in such forms as cloth, cord, yarns, fibers, etc., find use as superb reinforcing materials when mixed with or used in conjunction with such hydrophobic natural and synthetic polymers as rubber, poly(styrene), poly(ethylene), poly(vinyl chloride), etc., since these cellulosic copolymers have vastly improved compatibility with the admixed or coating material. By this means, the utility of such items as tires, reinforced rubber sheets, reinforced synthetic plastic sheets or other formed articles is improved.

Generally, all types of materials containing cellulose fibers of from 5 to 100 percent may be treated according to the above methods. For example, the process is applicable to cellulose substrates in the form of cotton, rayon, linen, jute, etc., fibers, sheets, yarns, fabrics, or ropes wherein the content of the cellulose containing material is of from 5 to 100 percent. The process is also applicable for treating wood in any physical form such as boards, poles and lumber.

*Example 1d*

Thirty parts of potato starch were placed in a beaker containing enough 0.063 M sodium hydroxide solution to cover it completely for ½-hour and then filtered on a Büchner funnel. The resultant alkaline-wet starch was then placed in an evacuated vacuum desiccator over carbon disulfide for about 4 hours in order to form a dithiocarbonate derivative of the starch. This dithiocarbonated starch was first suspended in about 100 parts of water, then filtered on a Büchner funnel and washed with water (300–400 parts) in order to remove all soluble by-products which had formed during the dithiocarbonation process. After washing, the moist dithiocarbonated starch was suspended in a previously prepared emulsion consisting of 25 parts acrylonitrile, 50 parts water, 1.5 parts Tween–85 (a polyoxyethylene sorbitantrioleate), and 3.0 parts of 30% hydrogen peroxide. After standing at room temperature (25° C. to 27° C.) for 18 hours, the copolymerized starch was removed from the polymerization mixture and thoroughly washed with water. The product, oven dried, weighed 40.8 parts, which constitutes a 74% yield of the theoretical. Prolonged extraction of this material with dimethylformamide indicated that 96.0% of the monomer which had been converted to polymer was nonextractable.

*Example 2d*

Thirty parts of potato starch were dithiocarbonated in the manner described in Example 1d, above. The dithiocarbonated starch was then suspended in an emulsion prepared from 22.5 parts styrene, 2.5 parts acrylonitrile, 50 parts of distilled water, 3.0 parts of Tween–85 and 3.0 parts of 30% hydrogen peroxide. After 18 hours' contact at room temperature with this emulsion, the starch copolymer was washed well with water and dried. The yield of copolymer amounted to 48.1 parts, which constitutes an 87.5% yield of the theoretical. Prolonged extraction with trichloroethane showed that 77.9% of the monomer which had been converted to copolymer could not be removed.

*Example 3d*

Thirty parts of potato starch were dithiocarbonated in the manner described in Example 1d and the resultant sodium starch dithiocarbonate was suspended in an emulsion consisting of 25 parts acrylamide, 50 parts water, and 3.0 parts of 30% hydrogen peroxide. After 18 hours at room temperature (25° C. to 27° C.), the product was washed thoroughly with water and dried. The yield of copolymer amounted to 48.4 parts, which constitutes a 73.7% conversion of monomer to unextractable polymer.

*Example 4d*

Thirty parts of potato starch were dithiocarbonated as described in Example 1d and the resultant sodium starch dithiocarbonate was suspended in an emulsion prepared from 25 parts ethyl acrylate, 50 parts water, 1.0 parts Tween–85 and 3.0 parts of 30% hydrogen peroxide. After 18 hours at room temperature, the starch copolymer was washed with water and dried. The copolymeric product amounted to 43.4 parts, which constitutes a 78% yield of the theoretical. Prolonged extraction of the product with acetone indicated that 81.1% of the monomer which had been converted to polymer could not be extracted.

*Example 5d*

Thirty parts of potato starch were dithiocarbonated and copolymerized as described in Example 4d. Upon standing at room temperature for about 3 hours, the starch copolymer was washed with water and dried. The copolymer product weighed 51 parts, which constitutes a 93% yield of the theoretical. Prolonged extraction with acetone indicated 70% of the monomer which had been converted to polymer could not be extracted.

*Example 6d*

Thirty parts of potato starch were dithiocarbonated and copolymerized as described in Example 1d. After 3 hours at room temperature, the starch copolymer was washed with water and dried. The copolymeric product amounted to 47.8 parts, which constitutes an 87% yield of the theoretical. Prolonged extraction with dimethylformamide indicated 86.5% of the monomer which had been converted to polymer could not be extracted.

*Example 7d*

Ten parts of potato starch were dithiocarbonated in the manner described in Example 1d, above. The dithiocarbonated starch was then washed thoroughly on a Büchner funnel with water to remove soluble by-products and then 100 parts of 0.06 M lead acetate solution were passed over and through the starch derivative to form lead starch dithiocarbonate by metathesis. The lead products, after washing with sufficient water (150–200 parts) to remove excess lead ions, were added to an emulsion prepared from 8.25 parts styrene, 0.75 part acrylonitrile, 100 parts of distilled water, 1.0 part of Tween–85 and 2.5 parts of 30% hydrogen peroxide. After 18 hours' contact at room temperature with this emulsion, the starch copolymer was washed well with water and dried. The yield of copolymer amounted to 14.6 parts, which constitutes a 77% yield of the theoretical. Prolonged extraction with trichloroethane showed that 100% of the monomer which had been converted to copolymer could not be removed.

*Example 8d*

Ten parts of potato starch were dithiocarbonated in the manner described in Example 1d and the resultant sodium starch dithiocarbonate was converted by metathesis to aluminum starch dithiocarbonate by substituting 0.06 M aluminum acetate for 0.06 M lead acetate, as illustrated in Example 7d, and suspended in an emulsion consisting of 9.25 parts ethyl acrylate, 100 parts water, and 2.5 parts of 30% hydrogen peroxide. After 18 hours at room temperature (25° C. to 27° C.), the product was washed thoroughly with water and dried. The yield of copolymer amounted to 71% (13.7 parts) of the theoretical of which 89.3% of the monomer which had been converted to polymer was non-extractable with acetone.

*Example 9d*

Ten parts of potato starch were dithiocarbonated as described in Example 1d and immediately thereafter converted to the aluminum salt as described in Example 8d. The aluminum starch dithiocarbonate was added to an emulsion consisting of 8.0 parts acrylonitrile, 100 parts water, 1.0 part Tween–85 and 2.5 parts of 30% hydrogen peroxide. After 18 hours at room temperature the starch copolymer was washed well with water and dried. The product weighed 13.2 parts, which constitutes a 173.5% yield of the theoretical. Prolonged extraction of this material with dimethylformamide indicated that all of the monomer which had been converted to polymer was non-extractable.

*Example 10d*

Ten parts of potato starch were dithiocarbonated as described in Example 1d and immediately thereafter converted by metathesis to the zinc starch dithiocarbonate by substituting 0.06 M zinc acetate for 0.06 M lead acetate as described in Example 7d. The zinc starch dithiocarbonate was suspended in a solution consisting of 10 parts acrylamide, 100 parts of water and 2.5 parts of 30% hydrogen peroxide. After 18 hours at room temperature, the starch copolymer was washed well with water and dried. The yield amounted to 13.5 parts, which constitutes a 35% conversion of monomer to unextractable polymer.

*Example 11d*

Ten parts of potato starch were placed in a breaker containing sufficient of 0.18 M sodium silicate solution to cover it completely. This mixture was allowed to remain at room temperature for 3 minutes, then filtered on A Büchner funnel to remove excess silicate solution. The sodium silicate wetted starch was then placed in an evacuated vacuum desiccator over carbon disulfide for about 4 hours before washing the product in water and filtering on a Büchner funnel. Immediately after washing, the dithiocarbonated starch was converted from the sodium salt to the lead salt by metathesis with lead acetate as in Example 7d and suspended in an emulsion containing 8.0 parts acrylonitrile, 100 parts water, 1.0 parts Teen–85 and 2.5 parts 30% hydrogen peroxide. After 18 hours in the reaction medium, the starch copolymer was washed thoroughly with water, yielding a dried product which amounted to (12.8 parts) 71.0% of the theoretical yield. Prolonged extraction of this copolymer with dimethylformamide indicated that 96.7% monomer converted to polymer was unextractable.

*Example 12d*

Ten parts of potato starch were sodium dithiocarbonated as described in Example 11d and immediately thereafter converted to the lead salt as described in Example 7d. The lead starch dithiocarbonate was added to an emulsion consisting of 9.3 parts of ethyl acrylate, 100 parts water, 0.5 parts Tween–85 and 2.5 parts of 30% hydrogen peroxide. After 18 hours at room temperature, the starch copolymer was washed well with water and dried. The yield of copolymer amounted to 82.0% (15.7 parts) of the theoretical of which 94.8% of the monomer which had been converted to polymer was non-extractable with acetone.

*Example 13d*

Ten parts of potato starch were dithiocarbonated as described in Example 11d. This sodium dithiocarbonated starch was then converted by metathesis to nickel starch dithiocarbonate by substituting 0.06 M nickel chloride for 0.06 M lead acetate, as described in Example 7d, and then suspended in an emulsion consisting of 8.25 parts styrene, 0.75 part acrylonitrile, 1.5 parts Tween–85, 100 parts of water, and 2.5 parts of 30% hydrogen peroxide. Upon standing at room temperature for 18 hours, the starch copolymer was removed from the polymerization mixture and thoroughly washed with water. The dried product weighed 11.4 parts, which constitutes a 60% yield of the theoretical of which 86.8% of the monomer which had been converted to polymer was nonextractable with dimethylformamide.

*Example 14d*

Ten parts of potato starch were placed in a beaker containing sufficient 0.25 M sodium aluminate solution to cover it completely. This mixture was allowed to remain at room temperature for about ½-hour, then filtered on a buchner funnel to remove excess aluminate solution. The sodium aluminate wetted starch was then placed in an evacuated vacuum desiccator over carbon disulfide for about 4 hours before washing the product in water and filtering on a Büchner funnel. Immediately after washing, the dithiocarbonated starch was converted from the sodium salt to the zinc salt by methathesis with zinc acetate as described in Example 10d and suspended in an emulsion containing 8.25 parts styrene, 0.75 part acrylonitrile, 100 parts water, 1.0 part Tween–85 and 2.5 parts 30% hydrogen peroxide. After 18 hours in the reaction medium, the starch copolymer was washed thoroughly with water, yielding a dried product which amounted to (12.9 parts) 68% of the theoretical yield. Prolonged extraction of this copolymer with trichloroethane showed that 85% of the monomer which had been converted to copolymer could not be removed.

*Example 15d*

Ten parts of potato starch were dithiocarbonated as described in Example 14d. This sodium dithiocarbonated starch was then converted to metathesis to nickel starch dithiocarbonate as in Example 13d and then suspended in an emulsion consisting of 9.3 parts ethyl acrylate, 100 parts water, 0.4 part Tween–85 and 2.5 parts of 30% hydrogen peroxide. After 18 hours at room temperature, the starch copolymer was washed with water and dried. The copolymeric product amounted to 12.1 parts, which constitutes an 86% yield of the theoretical. Prolonged extraction of the product with acetone indicated that 82.0% of the monomer which had been converted to polymer could not be extracted.

*Example 16d*

Ten parts of potato starch were placed in a beaker with enough 5% ammonium hydroxide to cover it completely. After about ½-hour, the starch dithiocarbonate was filtered of excess base on a Büchner funnel and then placed in a vacuum desiccator containing carbon disulfide for 4 hours. The resultant product was suspended in about 100 parts of water and followed by filtration on to a Büchner funnel. After further washing with water on the Büchner funnel, the ammonium dithiocarbonated starch was converted by metathesis to the aluminum derivative as described in Example 8d and suspended in 9.3 parts ethyl acrylate, 100 parts water, 0.4 part Tween–85 and 2.5 parts of 30% hydrogen peroxide. After 18 hours, the copolymerized starch was washed with water and dried. The product yield amounted to 13.9 parts, which constitutes 72.5% yield of the theoretical. Prolonged extraction in acetone indicated that 84.7% of the monomer which had been converted to polymer could not be extracted.

*Example 17d*

Ten parts of potato starch were placed in a beaker and enough 0.25 M. sodium carbonate was added to cover it completely. The mixture was allowed to stand at room temperature for about ½-hour and then filtered on a Büchner funnel.

This alkaline-wet starch was placed in an evacuated vacuum desiccator over carbon disulfide. After about 4 hours, the dithiocarbonated starch was suspended in about 100 parts of water, filtered on a Büchner funnel, washed with water (150–200 parts) and immediately converted to the lead salt by metathesis as described in Example 7d and then suspended in an emulsion consisting of 9.3 parts ethyl acrylate, 100 parts of water, 0.5 part of Tween–85 and 2.5 parts of 30% hydrogen peroxide. After 18 hours, the copolymerized starch was washed with water and dried. The product yield amounted to 15.00 parts, which constitutes 78% yield of the theoretical. Prolonged extraction in acetone indicated that 93.1% of the monomer which had been converted to polymer could not be extracted.

*Example 18d*

Ten parts of potato starch were placed in a beaker and enough sodium bicarbonate (saturated) solution was added to cover the starch. The mixture was allowed to stand at room temperature for about ½-hour and then filtered on a Büchner funnel. The alkaline-wet starch was placed in an evacuated vacuum desiccator over carbon disulfide for about 21 hours, after which the dithiocarbonated starch was suspended in about 100 parts of water, filtered, and thoroughly washed with water (150–200 parts). The dithiocarbonated starch was then dispersed in a solution containing 10 parts of acrylamide, 100 parts of water, 2.5 parts of 30% hydrogen peroxide. The polymerization mixture was adjusted to a pH of about 4.0 with 10% hydrochloric acid. Upon standing at room temperature for 18 hours, the starch copolymer was removed from the polymerization mixture and thoroughly washed with water. The dried product weighed 16.3 parts, which constitutes at 63.1% conversion of monomer to unextractable polymer.

*Example 19d*

Ten parts of potato starch were placed in a beaker and enough 0.0625 M sodium sulfide was added to cover the starch. The mixture was allowed to stand at room temperature for about five minutes and then filtered on a Büchner funnel.

This alkaline-wet starch was placed in an evacuated vacuum desiccator over carbon disulfide. After about 4 hours, the dithiocarbonated starch was suspended in about 100 parts of water, filtered on a Büchner funnel, washed with water (150–200 parts), and immediately converted to the zinc salt by metathesis, as described in Example 10d, then suspended in an emulsion consisting of 8.0 parts of acrylonitrile, 100 parts of water, 0.5 part of Tween–85 and 2.5 parts of 30% hydrogen peroxide. After 18 hours, the copolymerized starch was washed with water and dried. The product yield amounted to 13.0 parts, which constitutes 72% yield of the theoretical. Prolonged extraction in trichloroethane indicated that 90% of the monomer which had been converted to polymer could not be extracted.

*Example 20d*

Fifteen parts of potato starch were dithiocarbonated as described in Example 1d. This sodium dithiocarbonated starch was then converted by metathesis to ferrous starch dithiocarbonate by substituting 0.06 M ferrous ammonium sulfate for 0.06 M lead acetate, as described in Example 7d, and then suspended in an emulsion consisting of 12.0 parts acrylonitrile, 90 parts water, 0.5 part Tween–85 and 3.0 parts of 30% hydrogen peroxide. After standing at room temperature for 18 hours, the copolymerized starch was washed with water and dried. The product yield amounted to 22.2 parts, which constitutes 82% yield of the theoretical. Prolonged extraction in dimethylformamide indicated that 94% of the monomer which had been converted to polymer could not be extracted.

Although the examples shown above are with unpasted, granular potato starch, equally useful are such unpasted amylaceous substrates as wheat, corn, rice and tapioca starches, amylose, amylopectin, and chemically modified starches which still contain reactive hydroxyl groups either directly or on the anhydroglucose units making up the starch molecules, or on naturally occurring and/or synthetically inserted side chains. Generally, all types of materials containing amylaceous substances of from about 2% to 100% may be treated according to the above methods.

*Examples 21d–26d*

A number of 10-part samples of potato starch were dithiocarbonated and reacted in the manner described in Example 1d with the exception that the acrylonitrile was replaced with other polymerizable monomers. The following is a tabulation of these results:

| Example | Monomer | Wt. of Monomer Used (gms.) | Percent Conversion of Monomer to Polymer on Substrate | Percent Nonextractable Polymer |
|---|---|---|---|---|
| 21d | Methyl Acrylate | 9.3 | 80 | 80 |
| 22d | n-Butyl acrylate | 10.0 | 73 | 91 |
| 23d | Ethyl methacrylate | 9.3 | 77 | 86 |
| 24d | Glycidyl Methacrylate | 10.0 | 73 | 86 |
| 25d | Hydroxypropyl Methacrylate | 10.0 | 70 | 84 |
| 26d | Vinylidine Chloride | 10.0 | 75 | 77 |

*Examples 27d–32d*

A number of 10-part samples of potato starch were prepared and reacted as described in Example 20d. Ferration was effected by suspending the thioated substrate in 50 parts of a 0.004% aqueous ferrous ammonium sulfate solution and various monomers were substituted for acrylonitrile. The results are shown below:

| Example | Monomer | Wt. of Monomer Used (gms.) | Percent Conversion of Monomer to Polymer on Substrate | Percent Nonextractable Polymer |
|---|---|---|---|---|
| 27d | Acrylic Acid [1] | 10.0 | 70 | 100 |
| 28d | N,N-dimethylaminoethyl methacrylate | 10.0 | 71 | 100 |
| 29d | Vinyl Acetate | 9.5 | 68 | 91 |
| 30d | Styrene | 9.1 | 81 | 92 |
| 31d | Vinyl Toluene | 9.0 | 75 | 89 |
| 32d | Sodium p-styrene sulfonate [1] | 10.0 | 73 | 100 |

[1] Tween-85 omitted from this reaction.

The products derived from the reactions with acrylic acid, sodium p-styrene sulfonate and vinyl acetate are improved adhesives as well as excellent coating and sizing materials.

Example 1e

Ten parts of starch (potato) were placed in a beaker containing enough 0.063 M sodium hydroxide solution to cover it completely for ¼-hour. This alkaline starch was then placed in a gas drying tower, the outlet of which led to a mercury reservoir so that a slight gas pressure could be maintained within the drying tower. The inlet port of the drying tower was connected to a cylinder of carbonyl sulfide and sufficient carbonyl sulfide was flushed through the system to displace the air and to maintain a slight pressure to the atmosphere of carbonyl sulfide remaining over the alkaline starch. After about fifteen minutes' exposure time to the carbonyl sulfide, the sodium starch monothiocarbonate was washed well with about 300 parts of water, then uniformly dispersed in a previously prepared emulsion consisting of 45 parts of water, 8.0 parts of acrylonitrile, 0.5 part Tween–85 (a polyoxyethylene sorbitan trioleate) and 2.5 parts of 30% hydrogen peroxide and adjusted to a pH of about 5.0 with 5% hydrochloric acid.

After remaining at room temperature for 20 hours, the starch was removed from the polymerization medium and thoroughly washed with water. Upon drying, the starch product weighed 13.3 parts. This constituted a 74.0% yield of the theoretical. Prolonged extraction of this material with dimethylformamide indicated that 83% of the monomer which had been converted to polymer could not be extracted.

Example 2e

Ten parts of potato starch were monothiocarbonated as described in Example 1e and suspended in an emulsion consisting of 45 parts water, 8.25 parts styrene, 0.75 part acrylonitrile, 0.5 part Tween–85 and 2.5 parts 30% hydrogen peroxide and was adjusted to a pH of about 5.0 with 5% hydrochloric acid.

After 20 hours at room temperature, the starch was removed from the polymerization medium and thoroughly washed with water. Upon drying, the product weighed 16.3 parts. This was 85.5% of the theoretical yield and repeated extractions with dimethylformamide indicated that 79% of the monomer which had been converted to polymer could not be extracted.

Example 3e

Ten parts of potato starch were thiocarbonated as described in Example 1e. The resultant sodium starch monothiocarbonate was then washed well with about 300 parts of water followed by 100 parts of 0.06 M lead acetate solution. The lead starch monothiocarbonate was washed with about 150 parts of water, then uniformly dispersed in an emulsion such as that described in Example 1e.

After standing at room temperature for 20 hours, the starch was removed from the polymerization medium and thoroughly washed with water. Upon drying, the product weighed 16.6 parts which constituted an 87.5% yield of the theoretical. Repeated extractions with ethylene trichlorodie indicated that 89% of the monomer which had been converted to polymer could not be extracted.

Example 4e

Ten parts of potato starch were monothiocarbonated as described in Example 1e, and the resultant starch was then washed well with about 300 parts of water followed by 100 parts of 0.60 M zinc acetate solution. The resultant zinc starch monothiocarbonate was washed well with about 150 parts of water then uniformly dispersed in an emulsion consisting of 9.25 parts ethyl acrylate, 4.5 parts water, 0.3 part Tween–85 and 2.5 parts 30% hydrogen peroxide and adjusted to a pH of about 5.0 with 5% hydrochloric acid.

After standing for 20 hours at room temperature, the starch was removed and washed well with water. Upon drying, the product weighed 12.9 parts which constituted a 68% yield of the theoretical. Extraction with acetone revealed that 83.7% of the monomer which had been converted to polymer was nonextractable.

Example 5e

Ten parts of potato starch were monothiocarbonated in a manner described in Example 1e and the resultant product was washed well with about 300 parts of water followed by 25 parts of 0.25 M aluminum acetate solution which had been diluted with 75 parts of water. The aluminum starch monothiocarbonate product was washed with about 150 parts of water, then uniformly dispersed in an emulsion such as that described in Example 2e.

After standing at room temperature for 20 hours, copolymerized starch was removed from the polymerization medium and thoroughly washed with water. Upon drying, the product weighed 16.6 parts which constitutes an 87.5% yield of the theoretical. Extraction with ethylene trichloride showed 71.8% of the monomer which was converted to polymer was nonextractable.

Example 6e

Ten parts of potato starch were placed in a beaker containing enough 0.175 M sodium silicate solution to cover it completely for a few minutes and then filtered on a Büchner funnel. This alkaline-treated starch was then reacted with carbonyl sulfide in the manner described in Example 1e and suspended in a solution consisting of 10.0 parts acrylamide, 100 parts of water, and 2.5 parts of 30% hydrogen peroxide and adjusted to a pH of about 5.0 with 5% hydrochloric acid.

After standing at room temperature for about 20 hours, the copolymerized starch was removed from the polymerization medium and thoroughly washed with water. Upon drying, the product weighed 14.7 parts which constituted a 47% yield of the theoretical of which 100% was nonextractable.

Example 7e

Ten parts of potato starch were monothiocarbonated as described in Example 6e and converted by metathesis to the aluminum starch monothiocarbonate as described in Example 5e. The aluminum starch monothiocarbonate was then suspended in an emulsion consisting of 8.0 parts acrylonitrile, 50 parts water, 0.4 part Tween–85 and 2.5 ml. of 30% hydrogen peroxide. The polymerization mixture was adjusted to a pH of about 5.0 with 5% hydrochloric acid.

After standing for 20 hours at room temperature, the starch was removed from the polymerization medium and thoroughly washed with water. Upon drying, the product weighed 14.9 parts. This constituted an 83% yield of the theoretical, and 84% of the monomer which had been converted to polymer was nonextractable with dimethylformamide.

Example 8e

Ten parts of potato starch were monothiocarbonated as described in Example 6e and converted by metathesis to the lead derivative in a manner described in Example 3e. The resultant lead starch monothiocarbonate was suspended in emulsion consisting of 9.25 parts ethyl acrylate, 50 parts water, 0.4 part Tween–85 and 2.5 parts 30% hydrogen peroxide and adjusted to a pH of about 5.0 with 5% hydrochloric acid.

After remaining for 20 hours at room temperature, the starch was removed from the polymerization medium and thoroughly washed with water. Upon drying, the product weighed 16.6 parts which constituted an 86% yield of the theoretical. Extraction with acetone revealed that 91.3% of the monomer which had been converted to polymer could not be extracted.

Example 9e

Ten parts of potato starch were placed in a beaker containing enough 0.175 sodium silicate solution to cover it completely for a few minutes and then filtered on a Büchner funnel. This alkaline-treated starch was then reacted with carbonyl sulfide and converted to zinc salts as described in Example 4 and suspended in a solution such as that described in Example 6e.

After 18 hours, the copolymerized starch was washed thoroughly with water and dried. The product yield amounted to 16.2 parts which constitutes a 62% conversion of monomer to unextractable polymer.

Example 10e

Ten parts of potato starch were monothiocarbonated as described in Example 6e. The resultant thiocarbonated starch was washed well with 300 parts of water, then treated with 100 parts of 0.06 M cobaltous chloride solution. The cobaltous starch monothiocarbonate was washed with 150 parts of water and then uniformly suspended in an emulsion such as that described in Example 2e.

After 18 hours, the copolymerized starch was washed with water and dried. The product yield amounted to 14.0 parts which constitutes 73.5% yield of the theoretical. Prolonged extraction in trichloroethane indicated that 73% of the monomer which had been converted to polymer could not be extracted.

Example 11e

Ten parts of potato starch were monothiocarbonated as described in Example 6e and resultant monothiocarbonated starch was washed well with water, then treated with 100 parts of 0.06 M nickel sulfate solution. The nickel starch monothiocarbonate was washed with 150 parts of water and then uniformly dispersed in an emulsion such as that described in Example 1e. Upon standing at room temperature for 18 hours, the copolymerized starch was removed from the polymerization mixture and thoroughly washed with water. The dried product weighed 12.6 parts which constitutes a 70% yield of the theoretical. Prolonged extraction in dimethylformamide indicated that 91% of the monomer which had been converted to polymer could not be extracted.

Example 12e

Ten parts of potato starch were placed in a beaker and enough 1.4 M ammonium hydroxide solution was added to cover it completely. The alkali-wet starch was then reacted with carbonyl sulfide as described in Example 1e and suspended in an emulsion consisting of 8.25 parts styrene, 0.75 part acrylonitrile, 45 parts water, 0.5 part Tween–85 and 7.5 parts of 30% hydrogen peroxide and adjusted to a pH of about 5.0 with dilute hydrochloric acid.

After 20 hours at room temperature, the starch was removed from the polymerization medium and thoroughly washed with water. Upon drying, the product weighed 15.4 parts. This was 81.0% of the theoretical yield and repeated extractions with ethylene trichloride indicated that 84% of the monomer which had been converted to polymer could not be extracted.

Example 13e

Ten parts of potato starch were placed in a beaker and enough 5% sodium bicarbonate solution was added to cover it completely for about ¼-hour. The alkaline starch was then reacted with carbonyl sulfide as described in Example 1e and suspended in an emulsion such as that described in Example 6e.

After 20 hours at room temperature, the starch was removed from the polymerization medium and thoroughly washed with water. Upon drying, the product weighed 13.4 parts which constitutes a 34% conversion of monomer to unextractable polymer.

Example 14e

Ten parts of potato starch were placed in a beaker and enough 0.25 M sodium carbonate solution was added to cover it completely for about ¼-hour. The alkaline-wet starch was then reacted with carbonyl sulfide and copolymerized as described in Example 1e.

After 18 hours in this emulsion, the copolymerized starch was washed thoroughly with water. The dried product amounted to 65.0% (11.7 parts) of the theoretical yield and 70.2% of the polymer which had been converted to polymer could not be extracted with trichloroethane.

Example 15e

Ten parts of potato starch were soaked in a sufficient amount of 0.0625 M sodium sulfide solution for about ¼-hour. The alkaline-treated starch was filtered and reacted with carbonyl sulfide described in Example 1e. The monothiocarbonated starch was then dispersed in an emulsion containing 9.25 parts of ethyl acrylate, 45 parts of water, 0.3 part of Tween–85 and 2.5 parts of 30% hydrogen peroxide. The polymerization mixture was adjusted to a pH of about 5.0 with dilute hydrochloric acid. After 18 hours, the copolymerized starch was washed with water and dried. The product yield amounted to 12.5 parts which constitutes 65% yield of the theoretical. Prolonged extraction in acetone indicated that 82.9% of the monomer which had been converted to polymer could not be extracted.

Example 16e

Ten parts of potato starch were soaked in enough 0.0625 M sodium sulfide solution for about ¼-hour and reacted with carbonyl sulfide as described in Example 1e. The monothiocarbonate starch was converted by metathesis to the aluminum starch monothiocarbonate as described in Example 5e. The resultant product was next dispersed in an emulsion prepared from 8.0 parts of acrylonitrile, 45 parts of water, 0.4 part of Tween–85 and 2.5 parts of 30% hydrogen peroxide. The polymerization mixture was then adjusted to a pH of about 3.0 with dilute hydrochloric acid. Upon standing at room temperature for 18 hours, the copolymerized starch was removed from the polymerization mixture and thoroughly washed with water. The dried produce weighed 12.9 parts which constitutes a 72% yield of the theoretical. Prolonged extraction in dimethylformamide indicated that 83% of the monomer which had been converted to polymer could not be extracted.

Example 17e

Ten parts of potato starch were placed in a beaker and enough 0.25 M sodium carbonate solution was added to cover it completely for about ¼-hour. The alkaline-wet starch was then reacted with carbonyl sulfide as described in Example 1e to form the monothiocarbonated starch. The resultant thiocarbonated starch was washed well with about 200 parts of water, then treated with 100 parts of 0.06 M ferrous ammonium sulfate solution. The ferrous starch monothiocarbonate was washed with about 150 parts of water then uniformly dispersed in a solution consisting of 100 parts of water, 10 parts of acrylamide and 2.5 parts of 30% hydrogen peroxide and adjusted to a pH of 5.0 with dilute hydrochloric acid.

After 18 hours, the copolymerized starch was removed from the polymerization medium and thoroughly washed with water. The dried product weighed 17.0 parts which constitutes a 70% conversion of monomer to unextractable polymer.

Example 18e

Ten parts of potato starch were placed in a beaker and sufficient 0.25 sodium aluminate was added to cover it completely. After ¼-hour, it was filtered on a Büchner funnel and reacted with carbonyl sulfide as described in Example 1e. The thiocarbonated starch was then washed thoroughly on a Büchner funnel with water to remove soluble by-products and then 100 parts of 0.06 M zinc acetate solution wer passed over and through the starch derivative to form zinc monothiocarbonate by metathesis. The zinc product, after washing with sufficient water (150–200 parts) to remove excess zinc ions, was added to a solution such as that described in Example 17e, above. After 18 hours, the copolymerized starch was washed well with water and dried. The final product weighed 16.7 parts which constitutes a 67% conversion of monomer to extractable polymer.

Although the examples shown above are with unpasted, granular potato starch, such unpasted, granular amylaceous substrates as wheat, corn, rice and tapioca starches, amylose, amylopectin, and chemically modified starches which still contain reactive hydroxyl groups either directly on the anhydroglucose units making up the starch molecules, or on naturally occurring and/or synthetically inserted side chains. Generally, all types of materials containing amylaceous substances of from about 2 to 100% may be treated according to the above methods.

*Examples 19e–23e*

A number of 10-part samples of potato starch were treated and reacted with carbonyl sulfide in the manner described in Exmaple 1e with the exception that acrylonitrile was replaced by a variety of monomers as shown below:

| Example | Monomer | Wt. of Monomer Used (gms.) | Percent Conversion of Monomer to Polymer on Substrate | Percent Nonextractable Polymer |
|---|---|---|---|---|
| 19e | Glycidyl acrylate | 10.0 | 75 | 84 |
| 20e | 2-cyanoethylacrylate | 9.5 | 80 | 92 |
| 21e | Hydroxyethyl acrylate | 9.4 | 77 | 82 |
| 22e | Methacrylamide | 10.0 | 78 | 100 |
| 23e | Methyl methacrylate | 9.3 | 78 | 94 |

*Examples 24e–27e*

A series of 10-part samples of potato starch was monothio-carbonated in the manner described in Example #1e and then ferrated and reacted as described in Example #17e with the exception that the acrylamide was replaced by the following monomers:

| Example | Monomer | Wt. of Monomer Used (gms.) | Percent Conversion of Monomer to Polymer on Substrate | Percent Nonextractable Polymer |
|---|---|---|---|---|
| 24e | n-Butyl acrylate | 9.4 | 80 | 92 |
| 25e | 2-ethylhexyl acrylate | 10.0 | 75 | 84 |
| 26e | Styrene [1] | 9.2 | 79 | 80 |
| 27e | Vinylidene chloride | 10.0 | 76 | 83 |

[1] Polymerized at 50° C. for 4 hours.

The practicality of the products produced from the practice of this invention is immediately evident. Adhesives with improved bonding capacities result from copolymers of starch with acrylonitrile, lower alkylacrylates, acrylic acid or mixtures of these monomers. Also, copolymers of starch with acrylic or methacrylic acid yield useful ion-exchange powders, hydrophylic dusting powders and paper and textile coatings. Copolymers of starch with methylolated acrylamide make excellent sizing agents, nonwoven fabric binders and paper wet-strengthening resins. Still further, styrene or alkyl acrylate ester copolymers of starch find use as hydrophobic dusting powders and molding powders. These uses are merely a few examples of some of the specific ends to which such copolymers may be applied. To one familiar with the properties of polymers and copolymers, innumerable combinations of monomers to yield starch copolymers having properties and uses as those mentioned above suggest themselves, as well as other and diverse uses.

The herein-described graft polymerization inventions can be defined as a process of producing a copolymer of ethylenically unsaturated compounds and thioated substrates as defined herein which comprises reacting a water insoluble cellulose dithiocarbonate or monothiocarbonate derivative, or amylaceous dithiocarbonate or monothiocarbonate derivative via peroxidic free-radical initiation, with at least one ethylenically unsaturated monomer, preferably wherein (a) The thiocarbonate derivative is employed, or (b) The monomer is uniformly distributed in water, e.g., as a solution, an emulsion or as a mechanical dispersion, or (c) The reaction media contains a wetting agent, or (d) The thiocarbonate derivative is an alkali-metal salt, e.g., the sodium salt, e.g., wherein the alkali metal salt of the cellulose thiocarbonate is derived from a soluble alkali metal silicate, or from a water-soluble alkali metal aluminate, or the alkali metal salt of cellulose thiocarbonate is first converted to cellulose thiocarbonic acid before the polymerization is initiated, or (e) The cellulose material is formed from rayon.

Included in the above-defined inventions are the copolymers obtained by any of the above-described processes wherein the thioated substrate is a derivative of cotton, rayon, linen, or wood, or non-cellulosic amylaceous material, preferably starch, especially any of the above products which is a copolymer with acrylamide, acrylonitrile, acrylic acid, styrene, isoprene or butadiene or a mixture of monomers comprising one or more of the above monomers.

(f) The thiocarbonate derivative is a salt of at least one metal selected from the group consisting of metals in the Periodic Table's Groups Ib, IIa, IIb, IIIa, IIIb, IVb, Vb, VIb, VIIb, VIII, Ge, Sn, Pb, and Bi; or (g) The thiocarbonate derivative is a salt of at least one member of the group consisting of ammonia, primary, secondary, tertiary amine, quaternary ammonium, tertiary sulfonium, quaternary phosphonium, quaternary arsonium and quaternary stibonium salt, e.g., a salt is formed from a trimethylsulfonium precursor or the salt is tetrakis (hydroxymethyl) phosphonium; included in the above-described inventions are the products obtained by the process defined by (g); or (h) The monomer is selected from the group consisting of CHR=CHR; $H_2C=CR_2$; $R_2C=CR_2$ and

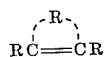

wherein R is selected from at least one member of the group consisting of (1) hydrogen; (2) alkyl group; (3) alkene group; (4) alkyne group; (5) aryl group; (6) substituted aryl group; (7) an electronegative group; (8) an alicyclic group; (9) a heterocyclic group; (10) a substituted heterocyclic group; (11) a carbalkoxy group of the general formula

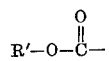

wherein R' is selected from the group consisting of hydrogen, R, hydrocarbons of from 1 to 18 carbon atoms, and substituted hydrocarbons of from 1 to 18 carbon atoms; (12) groups of the general formula

(13) groups of the general formula

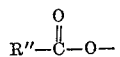

(14) groups of the general formula R''—O—; (15) groups of the general formula

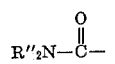

wherein R'' is selected from at least one member of the group consisting of hydrogen, R, and R', hydrocarbons of from 1 to 18 carbon atoms, substituted hydrocarbons of from 1 to 18 carbon atoms, and aliphatic groups of from 1 to 18 carbon atoms, especially wherein the thiocarbonate derivative is the dithiocarbonate derivative; or (i) The thiocarbonate derivative is a salt selected from at least one member of the group consisting of ammonia, primary, secondary, tertiary amine, quaternary organic ammonium, tertiary sulfonium, quaternary phosphonium, quaternary arsonium, quaternary stibonium, lithium, sodium and potassium, or a water-soluble salt of at least one metal selected from the group consisting of metals in the Periodic Table's Groups Ib, IIa, IIb, IIIa, IIIb, IVb, Vb, VIb, VIIb, VIII, Ge, Sn, Pb and Bi, which is reacted with the monomer dispersed in an aqueous solution, especially wherein the monomer is acrylamide, acrylic acid, acrylonitrile, a mixture of styrene and 2-ethylhexylacrylate or a mixture of acrylonitrile and styrene, especially wherein the thiocarbonate salt is a dithiocarbonate salt and more preferably wherein the dithiocarbonate salt is selected from at least one member of the group consisting of an alkali metal, ammonia and water-soluble amines, or is a ferrous, or ferric salt; included in the invention are the products obtained according to the process defined in (i), especially the products wherein the salt is ferrous, sodium or ammonium; or (j) The thiocarbonate derivative is mixed with the monomer in an aqueous solution in which the monomer is uniformly distributed, the peroxidic free-radical initiator is added to the solution containing the cellulose thiocarbonate salt derivative and the monomer, the reaction is allowed to proceed at a temperature of from 0° to 100° C. of from about 3 minutes to about 96 hours, and the formed copolymer is thereafter recovered from the solution; or (k) The thiocarbonate derivative is produced by reacting the corresponding water-insoluble cellulosic substrate, which is wet with an aqueous solution of a base, with carbon disulfide or carbonyl sulfide, especially carbon disulfide; the base preferably being a metal base, more preferably an alkali-metal hydroxide and especially sodium hydroxide; desirably by the steps of wetting the polymeric material with an aqueous solution of the selected base, separating the solution from the polymer wet with base, and exposing the polymer wet with base to the vapors of carbon disulfide or carbonyl sulfide or a solution thereof in an inert solvent; desirably also performing the last of the aforesaid steps substantially immediately after wetting the cellulosic substrate with the base; and desirably also thereafter washing the resulting copolymer with water to remove any excess monomer and soluble by-products of the reaction; plus all possible combinations of the above.

What is claimed is:

1. The process of producing a graft copolymer of ethylenically unsaturated compounds and derivatives of cellulose-containing or amylaceous-containing material which comprises reacting a water-insoluble cellulose or amylaceous dithiocarbonate or monothiocarbonate derivative, via peroxidic free radical initiation, with at least one ethylenically unsaturated monomer.

2. The products obtained according to the process of claim 1.

3. The process according to claim 1 wherein the thiocarbonate derivative is a cellulose dithiocarbonate derivative.

4. The products obtained according to claim 3 wherein the cellulose material is rayon.

5. The products obtained according to claim 3 wherein the cellulose material is cotton.

6. The products obtained according to claim 3 wherein the cellulose material is wood pulp.

7. The process according to claim 1 wherein the thiocarbonate derivative is an unpasted starch dithiocarbonate derivative.

8. The products obtained according to the process of claim 7.

9. The process according to claim 1 wherein the graft polymerization is conducted in an aqueous polymerization system in which the monomer is uniformly distributed.

10. The process according to claim 9 wherein the thiocarbonate derivative is a cellulose dithiocarbonate.

11. The process according to claim 9 wherein the peroxidic initiator is hydrogen peroxide.

12. The process according to claim 9 wherein the reaction is conducted in water.

13. The process according to claim 12 wherein the reaction is conducted in the presence of at least one member of the group consisting of an emulsifying agent sufficient to form a stable emulsion and a wetting agent.

14. The process according to claim 1 wherein the thiocarbonate derivative is a salt of at least one member of the group selected from ammonium, primary, secondary, tertiary amine, quaternary ammonium, tertiary sulfonium, quaternary phosphonium, quaternary arsonium, quaternary stibonium, lithium, sodium, potassium, Ge, Sn, Pb, Bi and metals in the Periodic Table's Groups Ib, IIa, IIb, IIIa, IIIb, IVb, Vb, VIb, VIIb and VIII.

15. The process according to claim 14 wherein the thiocarbonate derivative is a cellulose dithiocarbonate derivative.

16. The process according to claim 14 wherein the salt is an ammonium salt.

17. The process according to claim 14 wherein the salt is a tetrakis (hydroxymethyl) phosphonium salt.

18. The process according to claim 14 wherein the salt is the sodium salt.

19. The process according to claim 14 wherein the salt is the ferrous salt.

20. The process according to claim 1 which includes the step of converting a thiocarbonate salt of the cellulose-containing or amylaceous-containing material metathetically to another salt thereof.

21. The process according to claim 20 wherein the salt converted metathetically to another salt is the sodium or ammonium salt.

22. The process according to claim 20 wherein the metathetically produced salt is the salt of a metal selected from the group consisting of Ge, Sn, Pb, Bi and metals in the Periodic Table's Groups Ib, IIa, IIb, IIIa, IIIb, IVb, Vb, VIb, VIIb, and VIII.

23. The process according to claim 1 wherein the thiocarbonate derivative is a thiocarbonate salt produced by reacting metathetically a thiocarbonate salt of at least one member of the group consisting of ammonia, primary, secondary, tertiary amine, quaternary ammonium, tertiary sulfonium, quaternary phosphonium, quaternary arsonium, quaternary stibonium, lithium, sodium and potassium with a water-soluble salt of at least one metal selected from the group consisting of Ge, Sn, Pb, Bi and metals in the Periodic Table's Groups Ib, IIa, IIb, IIIa, IIIb, IVb, Vb, VIb, VIIb, and VIII.

24. The process according to claim 23 wherein the thiocarbonate derivative is a cellulose dithiocarbonate derivative.

25. The process according to claim 1 wherein the monomer has an ethylenic group at an unsubstituted terminal carbon atom.

26. The process according to claim 25 wherein the thiocarbonate is a cellulosic dithiocarbonate salt.

27. The process according to claim 1 wherein the monomer is at least one member of the group consisting of CHR=CHR and $H_2C=CR_2$; $R_2C=CR_2$ wherein R is selected from at least one member of the group consisting of (1) hydrogen; (2) alkyl group; (3) alkene group; (4) an alkyne group; (5) an aryl group; (6) an alicyclic group; (7) a heterocyclic group; (8) a carbalkoxy group of the general formula

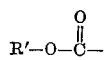

(9) groups of the general formula

(10) groups of the general formula

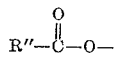

(11) groups of the general formula R''—O—; and (12) groups of the general formula

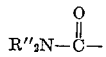

wherein R' and R'' are selected from a member of the group consisting of hydrogen and hydrocarbons of from 1 to 18 carbon atoms.

28. The process according to claim 27 wherein the thiocarbonate derivative is cellulose dithiocarbonate.

29. The process according to claim 27 wherein the monomer is acrylic acid.

30. The process according to claim 27 wherein the monomer is acrylonitrile.

31. The process according to claim 27 wherein the monomers are acrylonitrile and styrene.

32. The process according to claim 1 wherein the thiocarbonate derivative is regenerated viscose containing residual dithiocarbonate groups, substantially free from the water soluble by-products of the viscose process.

33. The process according to claim 27 wherein the monomer is vinylidene chloride.

34. The process according to claim 27 wherein the monomer is acrylamide.

35. The process according to claim 32 wherein the copolymerization reaction is part of a continuous viscose rayon process and follows the washing step which removes the coagulating bath solution and soluble by-products of the viscose process from the regenerated viscose rayon and precedes the desulfuring step and wherein the copolymerization is conducted in an aqueous system in which the monomer is uniformly distributed.

36. The process according to claim 34 which includes the step of reacting, by metathesis, the regenerated viscose rayon, prior to the graft polymerization, with a water soluble salt of at least one metal selected from the group consisting of Ge, Sn, Pb, Bi and metals in the Periodic Table's Groups, Ib, IIa, IIb, IIIa, IIIb, IVb, Vb, VIb, VIIb and VIII.

37. The process according to claim 36 wherein the salt is a magnesium salt.

38. The process according to claim 36 wherein the salt is an aluminum salt.

39. The process according to claim 36 wherein the salt is a ferrous salt.

40. The process according to claim 35 wherein the monomer is acrylic acid.

41. The process according to claim 35 wherein the monomer is acrylamide.

42. The process according to claim 35 wherein the monomer is acrylonitrile.

43. The process according to claim 35 wherein the monomer is a mixture of acrylonitrile and styrene.

44. The products produced according to the process of claim 35.

No references cited.

WILLIAM H. SHORT, *Primary Examiner.*

E. M. WOODBERRY, *Assistant Examiner.*